United States Patent
Vasil'evich et al.

(10) Patent No.: US 7,684,343 B2
(45) Date of Patent: Mar. 23, 2010

(54) DATA TRANSMISSION METHOD FOR WIRELESS NETWORK

(75) Inventors: Garmonov Alexander Vasil'evich, Voronezh (RU); Seok Ho Cheon, Yongin-si (KR); Do Hyon Yim, Yongin-si (KR); Ki Tae Han, Gyeonggi-do (KR); Savinkov Andrei Yur'evich, Voronezh (RU); Filin Stanislav Anatol'evich, Voronezh (RU); Manelis Vladimir Borisovich, Voronezh (RU); Moiseev Sergey Nikolayevich, Voronezh (RU); Kondakov Mikhail Sergeevich, Voronezh (RU); Yun Sang Park, Seoul (KR)

(73) Assignee: Samsung Electronics Co., Ltd (KR)

(*) Notice: Subject to any disclaimer, the term of this patent is extended or adjusted under 35 U.S.C. 154(b) by 909 days.

(21) Appl. No.: 11/384,915

(22) Filed: Mar. 20, 2006

(65) Prior Publication Data
US 2006/0239293 A1    Oct. 26, 2006

(30) Foreign Application Priority Data

| | | | |
|---|---|---|---|
| Mar. 18, 2005 | (RU) | ............................. | 2005107575 |
| Mar. 21, 2005 | (RU) | ............................. | 2005107744 |
| Mar. 22, 2005 | (RU) | ............................. | 2005108032 |
| Mar. 22, 2005 | (RU) | ............................. | 2005108033 |
| Jun. 8, 2005 | (RU) | ............................. | 2005117695 |

(51) Int. Cl.
*H04L 12/26* (2006.01)
*H04B 17/00* (2006.01)

(52) U.S. Cl. .................... 370/252; 370/445; 370/447; 370/328; 370/338; 370/462; 455/67.13; 455/63.1; 455/67.11

(58) Field of Classification Search ................ 370/252, 370/445, 447, 461, 462, 349, 317, 318, 310, 370/333, 328, 338
See application file for complete search history.

(56) References Cited

U.S. PATENT DOCUMENTS

| | | | | |
|---|---|---|---|---|
| 5,862,451 | A * | 1/1999 | Grau et al. ................ | 725/116 |
| 7,433,370 | B1 * | 10/2008 | Tymes ...................... | 370/474 |
| 2003/0152058 | A1 * | 8/2003 | Cimini et al. ............. | 370/338 |

* cited by examiner

*Primary Examiner*—Huy Q Phan
(74) *Attorney, Agent, or Firm*—The Farrell Law Firm, PC

(57) ABSTRACT

Disclosed is a device and method that relates to radio engineering and especially to data transmission in a wireless local area network. The method improves the throughput of the wireless local area network, by selecting a transmission rate, data transmission mechanism and a fragment size which maximize the network throughput considering the receiving conditions on the receiver (bit error rate in the transmitted data units of the transmitter) and taking into account the current network loading are selected for transmission of data units.

33 Claims, 4 Drawing Sheets

DATA TRANSMISSION METHOD FOR WIRELESS NETWORK

PRIORITY

This application claims the benefit under 35 U.S.C. § 119(a) of applications entitled "Data Transmission Method For Wireless Network" filed in the Russian Intellectual Property Office on Mar. 18, 2005 and assigned Ser. No. 2005107575, filed Mar. 21, 2005 and assigned Ser. No. 2005107744, filed Mar. 22, 2005 and assigned Ser. No. 2005108033, filed Mar. 22, 2005 and assigned Ser. No. 2005108032 and filed Jun. 8, 2005 and assigned Ser. No. 2005117695, the entire contents of which are incorporated herein by reference.

BACKGROUND OF THE INVENTION

1. Field of the Invention

The present invention relates to data a transmission method in a wireless network, and more a method for transmitting date in a IEEE (Institute of Electrical and Electronics Engineers) 802.11b data transmission wireless local area networks.

2. Description of the Related Art

The IEEE 802.11b standard is a widely spread standard covering a data transmission wireless local area network. The following are some main features of the standard that are necessary for better understanding of the invention claimed.

The IEEE 802.11b physical layer (PHY layer) provides for four transmission rates as 1; 2; 5.5 and 11 Mbps. The PHY characteristics of the IEEE 802.11b standard are entirely determined by dependences of bit error rate on signal-to-noise ratio (SNR).

Data units arriving at the MAC layer (MAC—medium access control) are divided to one or more fragments before transmission. A fragment of a data unit cannot be more than 18432 bits. For transmission of each fragment, a separate MAC protocol data unit (MPDU) is formed. An MPDU 100, shown in FIG. 1, is composed of a MAC header 101, a fragment of a data unit 103 and a frame check sequence 105 (FCS) and is transmitted at one of four transmission rates.

Before each MPDU, a PLCP (physical layer convergence protocol) preamble 107 and a PLCP header 109 having total length of 192 μs are transmitted at 1 Mbps transmission rate The operation of IEEE 802.11b wireless local area networks is based on a carrier sense multiple access with collision avoidance (CSMA/CA). A station having a data unit for transmission shall determine the current state of the medium. If the station identifies that the medium is idle for a time interval equal to a distributed interframe space (DIEFS), the station starts data transmission. If the station identifies that the medium is busy it must defer until the medium is not identified as idle during a time interval equal to DIEFS. Therefore, the station avoids collisions during busy mediums.

Transmission of an MPDU starts from a backoff interval 201, shown in FIG. 2. The beginning of the backoff interval matches for all stations having a data unit for transmission. Each station randomly selects the length of its backoff interval as a random value, uniformly distributed within the setup range. Access to the medium is given to a station that selects the minimal interval 203. It starts transmitting its MPDUs having deffered its backoff interval. The backoff interval of the IEEE 802.11b standard is measured in slots. The minimal interval of FIG. 2 is referred to as a number of idle slots 205 between two successive transmissions in the system.

If the minimal interval (203) of two or more stations matches, they start transmitting their MPDUs simultaneously. In this case collisions occur. During collisions, the probability of receiving the MPDUs is greatly reduced.

Two data transmission mechanisms, namely basic data transmission mechanism and request-to-send/clear-to-send data transmission mechanism, are stipulated for transmission of any MPDU in the IEEE 802.11b standard.

When applying the basic data transmission mechanism the following data transmission sequence, as shown in FIG. 3 is used. A station, which has won the contention, starts transmitting an MPDU 301 directly by the end of its backoff interval 303. In case of successfully receiving an MPDU (301) at the receiving station, the receiving station transmits an acknowledgement 305 (ACK) after a time interval equal to a short interframe space 307 (SIEFS). In the case of successfully receiving the ACK at the transmitting station, the MPDU is successfully received.

When applying the RTS/CTS mechanism, the following data transmission sequence is employed, as shown in FIG. 4. A station that has won the contention, starts transmitting a request-to-send 401 (RTS) by the end of its backoff interval 403. In case of successfully receiving the RTS 401, the receiving station transmits a clear-to-send 405 (CTS) after a time interval equal to the SIFS 407. In the case of successfully receiving the CTS 405, the transmitting station transmits an MPDU 409 after a time interval equal to the SIFS 407. In the case of successfully receiving the MPDU 409 at the receiving station, the receiving station transmits an ACK 411 after a time interval equal to the SIFS 407. In the case of successfully receiving the ACK 411 at the transmitting station, the MPDU 409 is received successfully.

The successful MPDU receiving probability depends on the collision probability in a system determined by the current number of active stations in the system and on the bit error rate (BER) in an MPDU determined by the signal-to-noise ratio (SNR) in a signal of the transmitting station on the receiving station. The successful MPDU receiving probability determines the IEEE 802.11b system throughput. Another factor for determining the throughput is the overhead accompanying the MPDU transmission.

Typical overhead includes: All time intervals when the medium is not busy, consisting of DIFS, Backoff interval (number of idle slots between two successive transmissions in a system) and SIFS; all control messages, consisting of RTS, CTS, and ACK; all control information; consisting of MAC header, FCS, PLCP preamble, and PLCP header. The greater the fragment size, the less the impact of overhead and the greater the MPDU error probability.

To maximize the IEEE 802.11b system throughput, each station can adaptively select a fragment size, transmission rate and transmission mechanism before transmission of each data unit.

A. Kamerman and L. Monteban, "WaveLAN-II: a high-performance wireless LAN for the unlicensed band," Bell Labs Technical J., pp. 118-133, summer 1997; and Daji Qiao, Sunghyun Choi, and Kang G. Shin, "Goodput analysis and link adaptation for IEEE 802.11a Wireless LANs," IEEE Trans. Mobile Comput., vol. 1, no. 4, pp. 278-292, October-December 2002 describe the following data transmission method in the IEEE 802.11b system.

In data unit transmission the used size of a fragment is equal to the size of a data unit. Any transmission rate is used in the transmission of the first data unit. A data unit is transmitted. If the data unit is correctly received, the next data unit is transmitted. If the data unit is incorrectly received, it is retransmitted. If two successive transmission attempts of the data unit are unsuccessful, the next more reliable transmission rate is selected as a transmission rate. If ten successive transmission attempts are successful, next less reliable transmission rate is selected as the next transmission rate. The obvious advantage of this method of data transmission in the IEEE 802.11b system is simplicity of implementation. One drawback of the method is the system throughput achieved in its application is significantly less then the maximum obtainable throughput, and that is disclosed in Daji Qiao, Sunghyun Choi, and Kang G. Shin, "Goodput analysis and link adaptation for IEEE 802.11a Wireless LANs," IEEE Trans. Mobile Comput., vol. 1, no. 4, pp. 278-292, October-December 2002.

According to the prior art disclosure the data transmission method in the IEEE 802.11b wireless local area network that comprises at least one transmitting station and one receiving station consists in the following: a database of dependence of the network throughput on signal-to-noise ratio (SNR), transmission rate and size of a data unit fragment is formed on the transmitting station, before transmitting a data unit, the current SNR value in a signal of the transmitting station is estimated at the transmitting station, those values of fragment size and transmission rate that correspond to the maximal value of the network throughput in the database are selected for the obtained SNR estimate, the selected fragment size is used for transmission of all fragments of a data unit, in transmission of fragments of a data unit, the selected transmission rate is used until a new estimate of the SNR in a signal of the transmitting station is obtained, and then a new transmission rate used in transmission of fragments of a data unit is selected. After obtaining a new estimate of the SNR in a signal of the transmitting station, a new transmission rate corresponding to the maximal value of the network throughput in the database for the selected fragment size is selected.

The prior art has some significant disadvantages. In the prior art, the SNR in a signal of the receiving station is used as an estimate of the SNR in a signal of the transmitting station. This is allowed only in the case of the transmitting and receiving stations are identical (with equal noise figure values) and that transmit at the same power.

The prior art does not consider the current network loading (number of active stations). At the same time, the network throughput and consequently optimal values of the fragment size and transmission rate greatly depend on the current network loading. Since the prior art does not consider this effect, the network throughput is greatly reduced.

The prior art also does not provide for adaptive selection of a data transmission mechanism. Station collision probability increases with an increase in network loading. In such conditions the RTS/CTS mechanism significantly excels the basic data transmission mechanism by the network throughput. As the prior art does not consider this effect, the network throughput is again greatly reduced.

SUMMARY OF THE INVENTION

An object of the present invention is to increase the throughput of the IEEE 802.11b wireless local area network.

In order to accomplish the aforementioned object, according to one aspect of the present invention, data transmission method for a wireless network that includes at least one transmitting station and one receiving station, comprising the steps of: at the receiving station, periodically estimating a signal-to-noise ratio in a signal of the transmitting station and the estimate is transmitting the estimate from the receiving station to the transmitting station; at the transmitting station, periodically estimating an average number of idle slots between two successive transmissions in the network; estimating a number of active stations in the network using the estimate of the average number of idle slots between two successive transmissions in the network; estimating station collision probability and an average number of stations in collision using the estimate of number of active stations in the network, before data unit transmission; extrapolating the obtained estimates of the signal-to-noise ratio, thus obtaining the extrapolated estimate of the signal-to-noise ratio; determining the optimal fragment size, optimal transmission rate and the respective value of network throughput for the basic data transmission mechanism using the extrapolated signal-to-noise ratio estimate and estimates of station collision probability and the average number of stations in collision; determining the optimal fragment size, optimal transmission rate and their respective value of network throughput for the request-to-send/clear-to-send data transmission mechanism using the extrapolated signal-to-noise ratio estimate and estimates of station collision probability and the average number of stations in collision; selecting the basic data transmission mechanism with the respective optimal fragment size and optimal transmission rate for data unit transmission, if the value of the network throughput for the basic data transmission mechanism is greater than the value of the network throughput for the request-to-send/clear-to-send data transmission mechanism; selecting the request-to-send/clear-to-send data transmission mechanism with the respective optimal fragment size and optimal transmission rate for the data unit transmission, if the value of the network throughput for the request-to-send/clear-to-send data transmission mechanism is greater than the value of the network throughput for the basic data transmission mechanism, the selected data transmission mechanism and its respective optimal fragment size are used for transmission of all fragments of a data unit, the selected optimal transmission rate is used at the first transmission of the first fragment of a data unit, before the next transmission of a fragment of a data unit; extrapolating the estimates of the signal-to-noise ratio obtained up to the moment of the beginning of the next transmission of a fragment of a data unit, thus obtaining a new extrapolated estimate of the signal-to-noise ratio, for the next transmission of a fragment of a data unit; and selecting a new optimal transmission rate using the current estimates of average number of idle slots between two successive transmissions in the network, station collision probability and the average number of stations in collision, and the new extrapolated estimate of the signal-to-noise ratio.

According to another aspect of the present invention, A data transmission method for a wireless network that includes at least one transmitting station and one receiving station, comprising the steps of: estimating an average number of idle slots between two successive transmissions in a network at a transmitting station; estimating a number of active stations in a network using the estimate of average number of idle slots between two successive transmissions in a network; estimating station collision probability and an average number of stations in a collision using the estimate of number of active stations in a network; transmitting L1, L2, L3, L4 data units, where L1, L2, L3, L4 are greater than or equal to 1, from the transmitting station to a receiving station using a basic data transmission mechanism, first, second, third and fourth transmission rates V1, V2, V3, V4 and such a fragment size; receiving at the transmitting station the same for all L1, L2, L3, L4 data units so that one data unit contain two or more fragments and first two fragments of each data unit have the same size, acknowledgements for those fragments of L1, L2, L3, L4 data units received without errors at the receiving station; estimating bit error rate $\alpha_{z,V1}$, $\alpha_{z,V2}$, $\alpha_{z,V3}$, $\alpha_{z,V4}$ for the first, second, third and fourth transmission rate in the transmitted data units of the transmitting station using information about a number of acknowledgements received after transmission of L1, L2, L3, L4 data units; determining a fragment size $\tilde{x}1^{(Basic)}$, $\tilde{x}2^{(Basic)}$, $\tilde{x}3^{(Basic)}$, $\tilde{x}4^{(Basic)}$ for the first, second, third and fourth transmission rate V1, V2, V3, V4 and the basic data transmission mechanism using an estimate of the bit error rate $\alpha_{z,V1}$ $\alpha_{z,V1}$, $\alpha_{z,V2}$, $\alpha_{z,V3}$, $\alpha_{z,V4}$ for the first, second, third and fourth transmission rate V1, V2, V3, V4 and the estimate of average number of idle slots between two successive transmissions in a network; determining a value of the network throughput W1$^{(Basic)}$, W2$^{(Basic)}$, W3$^{(Basic)}$, W4$^{(Basic)}$ for the first, second, third and fourth transmission rate V1, V2, V3, V4 and basic data transmission mechanism by means of the estimate of bit error rate $\alpha_{z,V1}$ $\alpha_{z,V1}$, $\alpha_{z,V2}$, $\alpha_{z,V3}$, $\alpha_{z,V4}$ for the first, second, third and fourth transmission rate V1, V2, V3, V4, fragment size $\tilde{x}1^{(Basic)}$, $\tilde{x}2^{(Basic)}$, $\tilde{x}3^{(Basic)}$, $\tilde{x}4^{(Basic)}$ for the first, second, third and fourth transmission rate V1, V2, V3, V4 and the basic data transmission mechanism, estimates of the average number of idle slots between two successive transmissions in the network, station collision probability and the average number of stations in a collision; determining a fragment size $\tilde{x}1^{(RTS-CTS)}$, $\tilde{x}2^{(RTS-CTS)}$, $\tilde{x}3^{(RTS-CTS)}$, $\tilde{x}4^{(RTS-CTS)}$ for the first, second, third and fourth transmission rate V1, V2, V3, V4 and request-to-send/clear-to-send data transmission mechanism by means of the estimate of the bit error rate $\alpha_{z,V1}$, $\alpha_{z,V2}$, $\alpha_{z,V3}$, $\alpha_{z,V4}$ for the first, second, third and fourth transmission rate V1, V2, V3, V4, estimates of average number of idle slots between two successive transmissions in the network, station collision probability and the average number of stations in a collision, a value of the network throughput W1$^{(RTS-CTS)}$, W2$^{(RTS-CTS)}$, W3$^{(RTS-CTS)}$, W4$^{(RTS-CTS)}$ for the first, second, third and fourth transmission rate V1, V2, V3, V4 and request-to-send/clear-to-send data transmission mechanism is determined by means of the estimate of the bit error rate $\alpha_{z,V1}$, $\alpha_{z,V2}$, $\alpha_{z,V3}$, $\alpha_{z,V4}$ for the first, second, third and fourth transmission rate V1, V2, V3, V4, fragment size $\tilde{x}1^{(RTS-CTS)}$, $\tilde{x}2^{(RTS-CST)}$, $\tilde{x}3^{(RTS-CTS)}$, $\tilde{x}4^{(RTS-CTS)}$ for the first, second, third and fourth transmission rate V1, V2, V3, V4 and the request-to-send/clear-to-send data transmission mechanism, estimates of the average number of idle slots between two successive transmissions in the network, station collision probability and the average number of stations in a collision; determining a value of the network throughput W1$^{(max)}$, W2$^{(max)}$, W3$^{(max)}$, W4$^{(max)}$ for the first, second, third and fourth transmission rate V1, V2, V3, V4 as a maximal value from the value of the network throughput W1$^{(Basic)}$, W2$^{(Basic)}$, W3$^{(Basic)}$, W4$^{(Basic)}$ for the first, second, third and fourth transmission rate V1, V2, V3, V4 and the basic data transmission mechanism and the value of the network throughput W1$^{(RTS-CTS)}$, W2$^{(RTS-CTS)}$, W3$^{(RTS-CTS)}$, W4$^{(RTS-CTS)}$ for the first, second, third and fourth transmission rate V1, V2, V3, V4 and the request-to-send/clear-to-send data transmission mechanism; comparing the value of the network throughput W1$^{(max)}$ for the first transmission rate V1 and the value of the network throughput W2$^{(max)}$ for the second transmission rate V2; if the value of the network throughput W1$^{(max)}$ for the first transmission rate V1 is greater than the value of the network throughput W2$^{(max)}$ for the second transmission rate V2, selecting the first transmission rate V1 for data transmission; comparing the value of the network throughput W1$^{(Basic)}$ for the first transmission rate V1 and the basic transmission mechanism and the value of the network throughput W1$^{(RTS-CTS)}$ for the first transmission rate V1 and the request-to-send/clear-to-send data transmission mechanism; if the value of the network throughput W1$^{(Basic)}$ for the first transmission rate V1 and the basic transmission mechanism is greater than or equal to the value of the network throughput W1$^{(RTS-CTS)}$ for the first transmission rate V1 and the request-to-send/clear-to-send data transmission mechanism, selecting the basic transmission mechanism and fragment size $\tilde{x}1^{(Basic)}$ for the first transmission rate V1 and basic transmission mechanism for data transmission, otherwise, selecting the request-to-send/clear-to-send data transmission mechanism and fragment size $\tilde{x}1^{(RTS-CTS)}$ for the first transmission rate V1 and request-to-send/clear-to-send data transmission mechanism for data transmission, if the value of the network throughput W1$^{(max)}$ for the first transmission rate V1 is less than the value of the network throughput W2$^{(max)}$ for the second transmission rate V2; comparing the value of the network throughput W2$^{(max)}$ for the second transmission rate V2 and the value of the network throughput W3$^{(max)}$ for the third transmission rate V3; if the value of the network throughput W2$^{(max)}$ for the second transmission rate V2 is more than the value of the network throughput W3$^{(max)}$ for the third transmission rate V3, selecting the second transmission rate V2 for data transmission; comparing the value of the network throughput W2$^{(Basic)}$ for the second transmission rate V2 and the basic transmission mechanism and the value of the network throughput W2$^{(RTS-CTS)}$ for the second transmission rate V2 and the request-to-send/clear-to-send data transmission mechanism; if the value of the network throughput W2$^{(Basic)}$ for the second transmission rate V2 and the basic transmission mechanism is greater than or equal to the value of the network throughput W2$^{(RTS-CTS)}$ for the second transmission rate V2 and the request-to-send/clear-to-send data transmission mechanism, selecting the basic transmission mechanism and fragment size $\tilde{x}2^{(Basic)}$ for the second transmission rate V2 and basic transmission mechanism for data transmission, otherwise, selecting the request-to-send/clear-to-send data transmission mechanism and fragment size $\tilde{x}2^{(RTS-CTS)}$ for the second transmission rate V2 and request-to-send/clear-to-send data transmission mechanism for data transmission, if the value of the network throughput W2$^{(max)}$ for the second transmission rate V2 is less than the value of the network throughput W3$^{(max)}$ for the third transmission rate V3; comparing the value of the network throughput W3$^{(max)}$ for the third transmission rate V3 and the value of the network throughput W4$^{(max)}$ for the fourth transmission rate V4; if the value of the network throughput W3$^{(max)}$ for the third transmission rate V3 is more than the value of the network throughput W4$^{(max)}$ for the fourth transmission rate V4, selecting the third transmission rate V3 for data transmission; comparing the value of the network throughput W3$^{(Basic)}$ for the third transmission rate V3 and the basic transmission mechanism and the value of the network throughput W3$^{(RTS-CTS)}$ for the third transmission rate V3 and the request-to-send/clear-to-send data transmission mechanism; if the value of the network throughput W3$^{(Basic)}$ for the third transmission rate V3 and the basic transmission mechanism is greater than or equal to the value of the network throughput W3$^{(RTS-CTS)}$ for the third transmission rate V3 and the request-to-send/clear-to-send data transmission mechanism, selecting the basic transmission mechanism and fragment size $\tilde{x}3^{(Basic)}$ for the third transmission rate V3 and basic transmission mechanism for data transmission, otherwise, selecting the request-to-send/clear-to-send data transmission mechanism and fragment size $\tilde{x}3^{(RTS-CTS)}$ for the third transmission rate V3 and request-to-send/clear-to-send data transmission mechanism for data transmission; if the value of the network throughput W3$^{(max)}$ for the third transmission rate V3 is less than the value of the network throughput W4$^{(max)}$ for the fourth transmission rate V4, selecting the fourth transmission rate V4 for data transmission; comparing the value of the network throughput W4$^{(Basic)}$ for the fourth transmission rate V4 and the basic transmission mechanism and the value of the network throughput $W4^{(RTS-CTS)}$ for the fourth transmission rate V4 and the request-to-send/clear-to-send data transmission mechanism; if the value of the network throughput $W4^{(Basic)}$ for the fourth transmission rate V4 and the basic transmission mechanism is greater than or equal to the value of the network throughput $W4^{(RTS-CTS)}$ for the fourth transmission rate V4 and the request-to-send/clear-to-send data transmission mechanism, selecting the basic transmission mechanism and fragment size $\tilde{x}4^{(Basic)}$ for the fourth transmission rate V4 and basic transmission mechanism for data transmission, otherwise, selecting the request-to-send/clear-to-send data transmission mechanism and fragment size $\tilde{x}4^{(RTS-CTS)}$ for the fourth transmission rate V4 and request-to-send/clear-to-send data transmission mechanism for data transmission; and transmitting data units from the transmitting station to the receiving station using the selected transmission rate, data transmission mechanism and fragment size selected for this transmission rate.

BRIEF DESCRIPTION OF THE DRAWINGS

The nature of the invention will be clear from the following description and accompanying drawings, in which.

DETAILED DESCRIPTION OF THE PREFERRED EMBODIMENTS

Preferred embodiments of the present invention will be described in detail herein below with reference to the accompanying drawings. In the following description, a detailed description of known functions and configurations incorporated herein will be omitted when it may obscure the subject matter of the present invention.

In what follows, the operation of the present invention of data transmission in IEEE (Institute of Electrical and Electronics Engineers) 802.11b wireless local area network.

Some features of the standard are necessary for better understanding the present invention are disclosed below.

The IEEE 802.11b physical layer (PHY layer) provides for four transmission rates as 1; 2; 5.5 and 11 Mbps. The PHY characteristics of IEEE 802.11b standard are entirely determined by dependences of bit error rate on signal-to-noise ratio (SNR).

Figure 1:
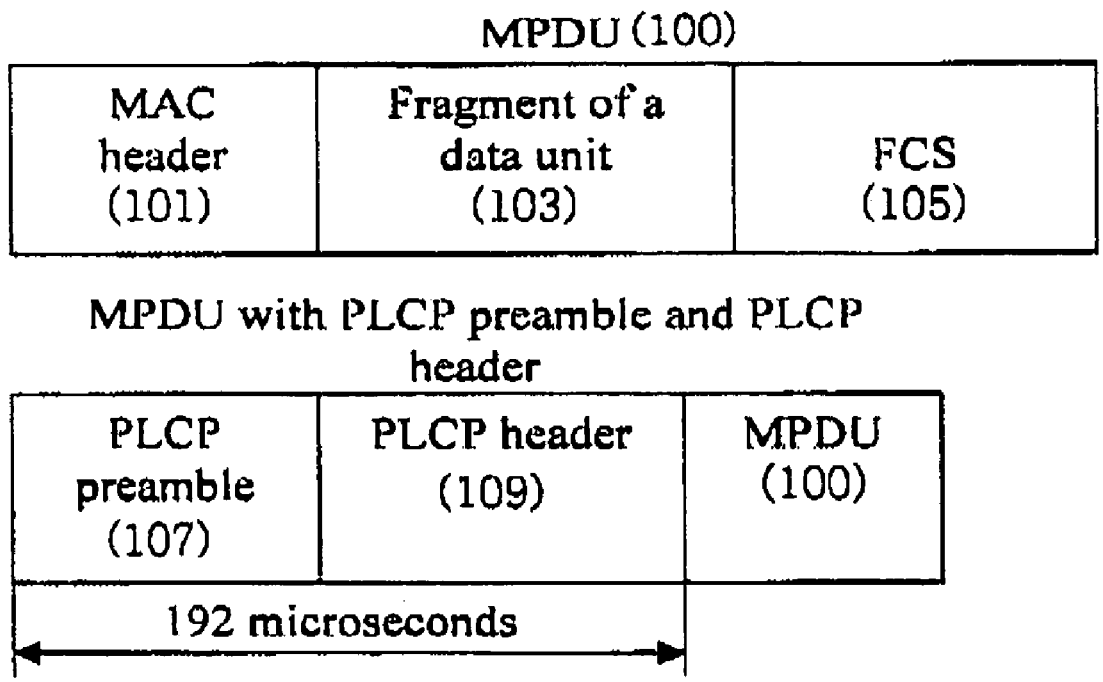
FIG. 1 illustrates an MPDU.

Data units arriving to the MAC (Medium Access Control) layer are divided to one or more fragments before transmission. A fragment of a data unit cannot be more than 18432 bits. For transmission of each fragment, a separate MAC protocol data unit 100 (MPDU) is formed. An MPDU as shown in FIG. 1 is composed of a MAC header 101, a fragment of a data unit 103 and a frame check sequence 105 (FCS) and is transmitted at one of four transmission rates. Before each MPDU, a PLCP (physical layer convergence protocol) preamble 107 and a PLCP header 109 having total length of 192 µs are transmitted at 1 Mbps transmission rate.

The operation of IEEE 802.11b wireless local area networks is based on a carrier sense multiple access with collision avoidance (CSMA/CA). A station having a data unit for transmission shall determine the current state of the medium. If the station identifies that the medium is idle for a time interval equal to a distributed interframe space (DIFS), the station starts data transmission. If the station identifies, that the medium is busy, it must defer until the medium is not identified as idle during a time interval equal to DIFS. Therefore, the station avoids collisions in the busy medium.

Figure 2:
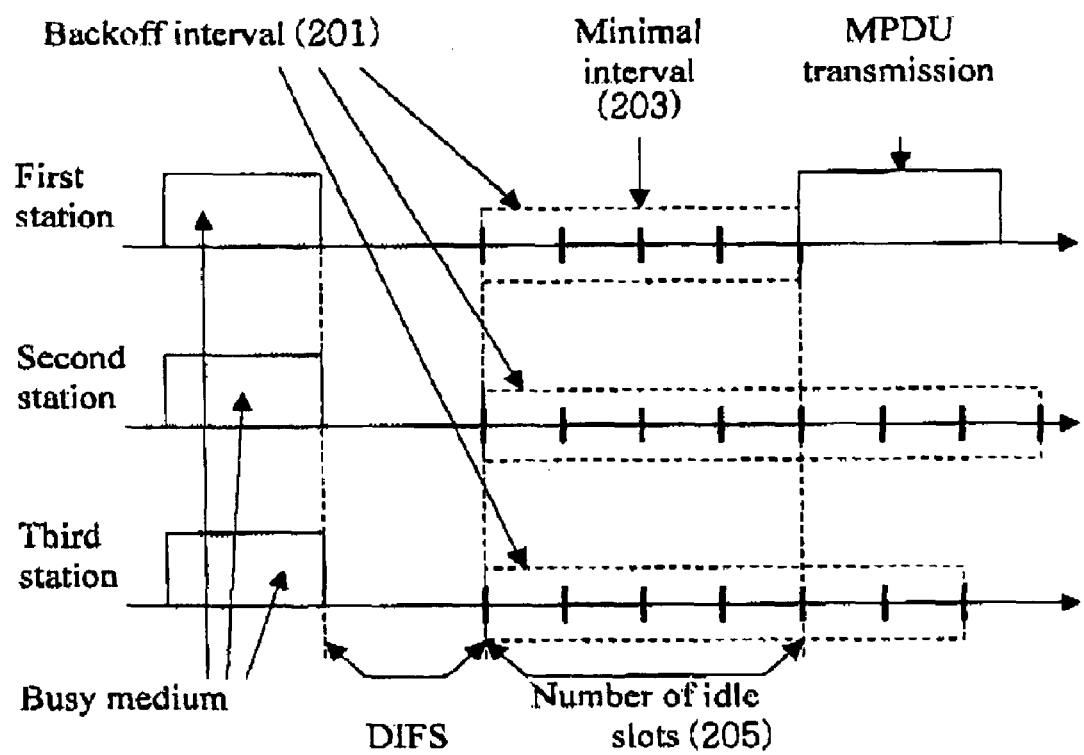
FIG. 2 shows an embodiment of the MPDU transmission.

Transmission of an MPDU starts from a backoff interval as shown in FIG. 2. Beginning of the backoff interval 201 matches for all stations having a data unit for transmission. Each station randomly selects the length of its backoff interval as a random value uniformly distributed within the setup range. Access to the medium is given to a station that selects the minimal interval. It starts transmitting its MPDUs having deffered its backoff interval. The backoff interval of IEEE 802.11b standard is measured in slots. Let the minimal interval 203 of FIG. 2 be referred to as a number of idle slots between two successive transmissions in the system. If the minimal interval of two or more stations matches, they start transmitting their MPDUs simultaneously. In this case collision occurs. In collision none of MPDUs is probably received. Two data transmission mechanisms, namely basic data transmission mechanism and request-to-send/clear-to-send data transmission mechanism, are stipulated for transmission of any MPDU in IEEE 802.11b standard.

Figure 3:
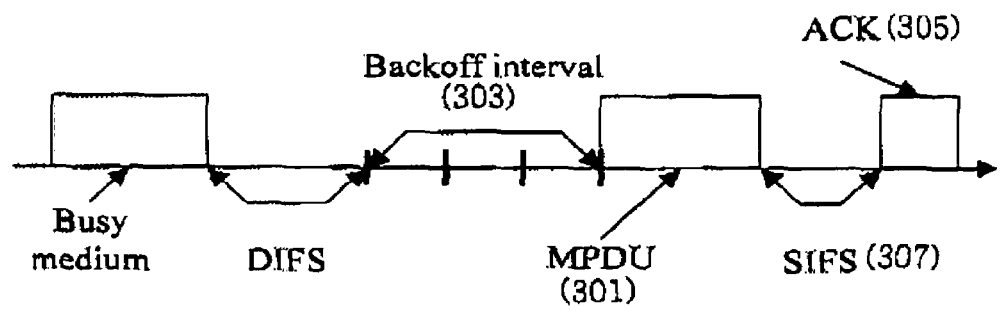
FIG. 3 illustrates the basic data transmission mechanism.

When applying the basic data transmission mechanism the following data transmission sequence shown in FIG. 3 is used. A station, which has won the contention, starts transmitting an MPDU 301 directly by the end of its backoff interval 303. In case of successful receiving of an MPDU 301 on the receiving station, the receiving station transmits an acknowledgement 305 (ACK) after a time interval equal to a short interframe space 307 (SIFS). In case of successful receiving of the ACK 305 on the transmitting station, the MPDU 301 is successfully received.

Figure 4:
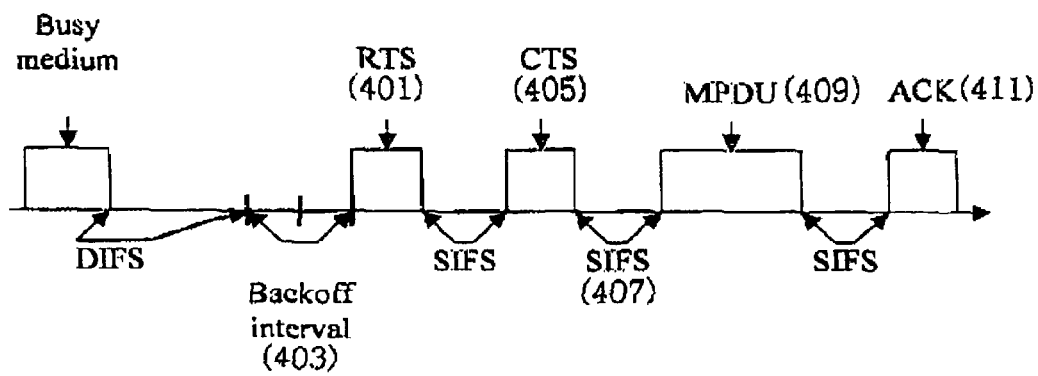
FIG. 4 demonstrates the RTS/CTS data transmission mechanism.

When applying the RTS/CTS mechanism, the following data transmission sequence is employed as shown in FIG. 4. A station that has won the contention, starts transmitting a request-to-send 401 (RTS) by the end of its backoff interval 403. In case of successful receiving of the RTS, the receiving station transmits a clear-to-send 405 (CTS) after a time interval equal to the SIFS 407. In case of successful receiving of the CTS 405, the transmitting station transmits an MPDU 409 after a time interval equal to the SIFS 407. In case of successful receiving of the MPDU 409 on the receiving station, the receiving station transmits an ACK 411 after a time interval equal to the SIFS 407. In case of successful receiving of the ACK 411 on the transmitting station, the MPDU 409 is received successfully.

The successful MPDU receiving probability depends on the collision probability in a system determined by current number of active stations in the system and on the bit error rate (BER) in an MPDU determined by the signal-to-noise ratio (SNR) in a signal of the transmitting station on the receiving station. The successful MPDU receiving probability determines the IEEE 802.11b system throughput. Another factor determining the throughput is overhead accompanying MPDU transmission.

Overhead includes: All time intervals when the medium is not busy, that includes DIFS, backoff interval (number of idle slots between two successive transmissions in a system), SIFS; all control messages, that include RTS, CTS, and ACK, all control information, that includes MAC header, FCS, PLCP preamble, and PLCP header. The greater the fragment size, the less the impact of overhead and the higher the MPDU error probability.

To maximize IEEE 802.11b system throughput, each station can adaptively select a fragment size, transmission rate and transmission mechanism before transmission of each data unit.

IEEE 802.11b data transmission local wireless network comprising at least one transmitting station and one receiving station is analyzed below. The number of stations in the general case will be above two.

Figure 5:
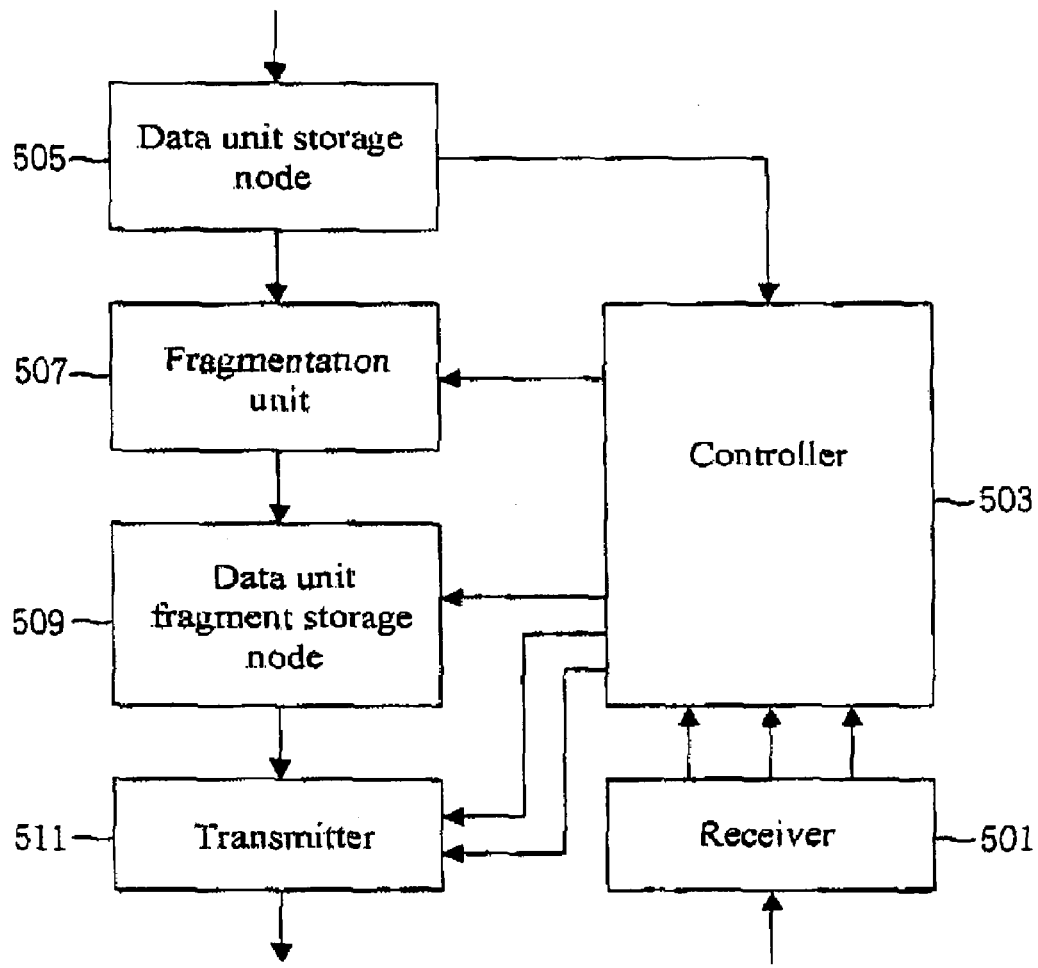
FIG. 5 shows a block-diagram of a device implementing in embodiments of the present invention.

The present invention is implemented on a device illustrated in FIG. 5.

A data transmission device in the IEEE 802.11b wireless local area network contains receiver 501, controller 503, data unit storage node 505, fragmentation unit 507, data unit fragment storage node 509, and transmitter 511. An input of receiver 501 is a first input of the data transmission device in the IEEE 802.11b wireless local area network. First and second outputs of receiver 501 are connected with first and third inputs of controller 503, respectively. First and third outputs of controller 503 are connected with the first and third inputs of transmitter 511, respectively. Second output of controller 503 is connected with the first input of fragmentation unit 507. Fourth output of controller 503 is connected with the second input of data unit fragment storage node 509. An input of data unit storage node 505 is the second input of the data transmission device in the IEEE 802.11b wireless local area network. First output of data unit storage node 505 is linked with the second input of controller 503. Second output of data unit storage node 505 is connected with the second input of fragmentation unit 507, which output is linked with the first input of data unit fragment storage node 509, output of which is linked with the second input of transmitter 511, which output is an output of the data transmission device in the IEEE 802.11b wireless local area network.

Data unit storage node 505 is a queue of data units. Data unit fragment storage node 509 is a queue of fragments of a data unit.

Receiver 501, controller 503, data unit storage node 505, fragmentation unit 507, data unit fragment storage node 509 and transmitter 511 can be embodied on a digital signal processor (DSP) or a special-purpose chip.

The claimed data transmission method in IEEE 802.11b wireless local area network provides three parallel processes, namely: Periodical estimation of SNR in a signal of the transmitting station, Periodical estimation of characteristics of the current network loading, and Transmission of data units and fragments of a data unit from the transmitting station to the receiving station with preliminary selection of data transmission mechanism, fragment size and transmission rate.

The current estimate of the SNR obtained on the receiving station and estimates of characteristics of the current network loading obtained on the transmitting station are used on the transmitting station to select the data transmission mechanism, fragment size and transmission rate.

The periodical estimation of the SNR in a signal of the transmitting station is performed as follows. At the receiving station, signal-to-noise ratio in a signal of the transmitting station is periodically estimated and the said estimate is transmitted from the receiving station to the transmitting station, where this estimate is received. At the transmitting station, values of its transmission power and noise figures are a priori known in controller 503. If the values of transmission power and noise figure of the receiving station are known in controller 503 on the transmission station, they are applied. If the values of transmission power and noise figure of the receiving station are unknown, a signal of the receiving station or any station of the network containing values of the transmission power and noise figure of the receiving station is received on the transmitting station.

A signal containing the values of transmission power and noise figure of the receiving station is transmitted from the receiving station or any other station of the network to the transmitting station using a radio interface stipulated by the IEEE 802.11b standard. A signal containing the values of transmission power and noise figure of the receiving station arrives to the input of receiver 501, which is the first input of data transmission device in the IEEE 802.11b wireless local area network, and is applied from the fourth output of the said receiver to the fifth input of controller 503.

The SNR in a signal of the receiving station is periodically estimated in receiver 501 on the transmitting station. The SNR in a signal of the transmitting station is estimated on the receiving station by one of the known approaches. The ratio of the desired signal power chip to the noise power is employed as a signal-to-noise ratio.

An estimate of the SNR in a signal of the transmitting station is transmitted from the receiving station to the transmitting station using a radio interface stipulated by IEEE 802.11b standard. The estimate of the SNR in a signal of the transmitting station is applied to the input of receiver 501, which is the first input of the data transmission device in IEEE 802.11b wireless local area network, and is fed from the first output of receiver 501 to the first input of controller 503.

In controller 503, the SNR of a signal of the transmitting station is estimated using the SNR estimate in a signal of the receiving station, preset values of the transmission power and noise figure of the transmitting station, and preset or received values of the transmission power and noise figure of the receiving station.

Wherein, the signal-to-noise ratio in the signal of the transmitting station z is estimated by the formula $z = z_0 \cdot (P_1/P_0) \cdot 10^{(F_0 - F_1)/10}$, where $z_0$ is an estimate of the signal-to-noise ratio in the signal of the receiving station, $P_1$ is transmission power of the transmitting station, $P_0$ is transmission power of the receiving station, $F_1$ is a noise figure of the transmitting station, and $F_0$ is a noise figure of the receiving station.

The estimation of the SNR in a signal of the transmitting station and transmission of this estimate from the receiving station to the transmitting station are performed periodically. In selection of the data transmission mechanism, the fragment size and/or transmission rate, the current (the latest) value of the estimate of the SNR is used.

Characteristics of the current IEEE 802.11b network loading are the following: Average number of idle slots between two successive transmissions in the network, Number of active stations in the network, Station collision probability, and Average number of stations in collision.

The periodical process of estimation of the characteristics of the current network loading is performed in the following way. At the transmitting station, average number of idle slots between two successive transmissions in the network is periodically estimated. An estimation process of the current network loading characteristics is performed as follows. An average number of idle slots between two successive transmissions in the network is estimated on the transmitting station.

The following sequence of actions is, for instance, performed to attain, on the transmitting station, the estimate of average number of idle slots between two successive transmissions in the network.

In receiver 501 K successive measurements (where K is greater than or equal to 1) of number of idle slots between two successive transmissions in the network are performed and transmitted from the first output of receiver 501 to the first input of controller 503. These measurements are performed by means of the medium occupation physical control mechanism provided by IEEE 802.11b standard.

K successive measurements of number of idle slots between two successive transmissions in the network are averaged in controller 503, thus obtaining the first estimate of the number of idle slots between two successive transmissions in the network.

Each subsequent estimate of average number of idle slots between two successive transmissions in the network is obtained in controller 503 by averaging each new measurement with (K−1) previous measurements.

In controller 503, number of active stations in the network is estimated using the estimate of the average number of idle slots between two successive transmissions in the network.

If number of stations $N_0$ registered in the network is known on the transmitting station, the number of active stations in the network N is estimated by the formula $N=\min\{N_0, (c_1/s+c_2)^{c_3}\}$, where s is the estimate of average number of idle slots between two successive transmissions in the network, $c_1$=const is a constant value equal to 1.55, $c_2$=const is a constant value equal to 0.9, and $c_3$=const is a constant value equal to 6.949.

If number of stations registered in the network is unknown at the transmitting station, the number of active stations in the network N is estimated by the formula $N=(c_1/s+c_2)^{c_3}$, where s is an estimate of average number of idle slots between two successive transmissions in the network, $c_1$=const is a constant value equal to 1.55, $c_2$=const is a constant value equal to 0.9, and $c_3$=const is a constant value equal to 6.949.

Station collision probability and average number of stations in collision are estimated in controller 503.

The station collision probability P is estimated by the formula $P=c_4 \cdot [\ln(N)]^{c_5}$, where N is an estimate of number of active stations in the network, $c_4$=const is a constant value equal to 0.114, and $c_5$=const is a constant value equal to 1.11.

The average number of stations in collision J is estimated by the formula $J=2+c_6 \cdot [\ln(N-1)]^{c_7}$, where N is an estimate of number of active stations in the network, $c_6$=const is a constant value equal to 0.0263, and $c_7$=const is a constant value equal to 1.744.

L1 data units, where L1 is greater than or equal to 1, are transmitted from the transmitting station to a receiving station using a basic data transmission mechanism, first transmission rate V1 and such a fragment size, the same for all L1 data units so that one data unit contain two or more fragments and first two fragments of each data unit have the same size. The data units are applied to the input of data unit storage node 505. Sizes of L1 data units are transmitted from the first output of data unit storage node 505 to the second input of controller 503. Such a fragment size is selected for L1 data units in controller 503 that one data unit to contain 2 or more fragments and two first fragments of each data unit to have the same size. That can be done by selecting the fragment size to be approximately equal to half size of a data unit which has the minimal size among L1 data units. The selected fragment size is transmitted from the second output of the controller to the first input of the fragmentation unit.

Information about a basic data transmission mechanism selected in controller 503 for transmission of L1 data units is applied from the third output of controller to the third input of transmitter 511. Information about the first transmission rate V1 (1 Mbps) selected in controller 503 for transmission of L1 data units is applied from the first output of controller 503 to the first input of transmitter 511.

The next data unit is applied from the second output of data unit storage node 505 to the second input of fragmentation unit 507 and then it is excluded from data unit storage node 505. Fragmentation of the next data unit is performed in fragmentation unit 507 by means of the information about the selected fragment size. A set of fragments of a data unit applies from the output of fragmentation unit 507 to the first input of data unit fragment storage node 509.

The next fragment of a data unit is applied from the output of data unit fragment storage node 509 to the second input of transmitter 511.

In transmitter 511, an MPDU is formed from the applied fragment of the data unit, the MPDU is prepended by a PLCP preamble and PLCP header and transmitted from the output of transmitter 511 to the receiving station.

If the MPDU is received without errors on the receiving station, an acknowledgement is transmitted from the receiving station to the transmitting station. If the acknowledgement is received without errors at the transmitting station, it applies to the input of receiver 501, from which second output it applies to the third input of controller 503, from which fourth output it applies to the second input of data unit fragment storage node 509. In receiving the acknowledgement for the fragment, this fragment is excluded from data unit fragment storage node 509.

If the MPDU is received with errors at the receiver station or an acknowledgement is received with errors on the transmitting station, the fragment is not excluded from data unit fragment storage node 509 and is transmitted again.

Acknowledgements for transmissions of all fragments of L1 data units received without errors on the receiving stations are received on the transmitting station by the above described method. In controller 503, bit error rate $\alpha_{z,V1}$ for the first transmission rate is estimated in the transmitted data units of the transmitting station using an information about number of acknowledgements received after transmission of L1 data units.

To obtain a bit error rate $\alpha_{z,V1}$ for the first transmission rate V1 at the transmitting station number $L1_{ACK,2}$ of acknowledgements of receiving of the second fragments transmitted after error-free receiving of the first fragments in the transmission of L1 data units is calculated, bit error rate $\alpha_{z,V1}$ for the first transmission rate V1 is determined using the second fragments of L1 transmitted data units by the formula $$\alpha_{z,V1} = 1 - \left(\frac{L1_{ACK,2}}{L1}\right)^{1/x},$$

where x is a fragment size.

To obtain the bit error rate $\alpha_{z,V1}$ for the first transmission rate V1 at the transmitting station, the number $L1_{ACK,1}$ of acknowledgements of receiving of the first fragments in the transmission of L1 data units is calculated, and Bit error rate $\alpha_{z,V1}$ for the first transmission rate V1 is determined using the first fragments of L1 transmitted data units by the formula $$\alpha_{z,V1} = 1 - \left(\frac{L1_{ACK,2}}{L1 \cdot (1-P)}\right)^{1/x},$$

where P is an estimate of the station collision probability, and x is a fragment size.

To obtain the bit error rate $\alpha_{z,V1}$ for the first transmission rate V1 at the transmitting station, bit error rates $\alpha_{z,V1}$ for the first transmission rate V1 is determined using the second fragments of L1 transmitted data units, bit error rates $\alpha_{z,V1}$ for the first transmission rate V1 is determined using the first fragments of L1 transmitted data units, and bit error rates $\alpha_{z,V1}$ for the first transmission rate V1 obtained by means of the first and second fragments of L1 transmitted data units are averaged.

In controller 503, a fragment size $\tilde{x}1^{(Basic)}$ is determined for the first transmission rate V1 and the basic data transmission mechanism using an estimate of the bit error rate $\alpha_{z,V1}$ for the first transmission rate V1 and the estimate of the average number of idle slots between two successive transmissions in a network.

Fragment size $\tilde{x}1^{(Basic)}$ for the first transmission rate V1 and basic transmission mechanism is determined by the formula $$\tilde{x}1^{(Basic)} = \begin{cases} x_{\max}, & x1^{(Basic)} \geq x_{\max}, \\ 8 \cdot ceil\{x_{\max}/(8 \cdot g1^{(Basic)})\}, & \text{else,} \end{cases}$$

where $x_{max}$ is a size of a data unit, $g1^{(Basic)} = \text{round}\{x_{max}/x1^{(Basic)}\}$, round{ } means a rounding to the nearest integer, ceil{ } is a rounding up operation, $x1^{(Basic)} = (b_{V1}/2) \cdot (\sqrt{1+4/(b_{V1} \cdot \alpha_{z,V1})} - 1)$, $b_{V1} = \tau_{V1}/t_{V1}$, $\tau_{V1} = c_8 \cdot s + c_9 + c_{10} \cdot t_{V1}$, $c_8$=const is a constant value equal to 20, $c_9$=const is a constant value equal to 444, and $c_{10}$=const is a constant value equal to 336, s is an estimate of average number of idle slots between two successive transmissions in the network, and $t_{V1} = 1/V1$.

In controller 503, a value of the network throughput $W1^{(Basic)}$ for the first transmission rate V1 and basic data transmission mechanism are determined by means of the estimate of bit error rate $\alpha_{z,V1}$ for the first transmission rate V1, frame size $\tilde{x}1^{(Basic)}$ for the first transmission rate V1 and the basic data transmission mechanism, estimates of the average number of idle slots between two successive transmissions in the network, station collision probability and the average number of stations in a collision.

A value of the network throughput $W1^{(Basic)}$ for the first transmission rate V1 and basic transmission mechanism is determined by the formula $W1^{(Basic)} = \tilde{x}1^{(Basic)} \cdot (1-\alpha_{z,V1})^{x1^{(Basic)}}/((\tilde{x}1^{(Basic)} \cdot t_{V1} + \tau_{V1}) \cdot (1+P/(J \cdot (1-P))))$, where $\tau_{V1} = c_8 \cdot s + c_9 + c_{10} \cdot t_{V1}$, $c_8$=const is a constant value equal to 20, $c_9$=const is a constant value equal to 444, and $c_{10}$=const is a constant value equal to 336, s is an estimate of average number of idle slots between two successive transmissions in the network, $t_{V1} = 1/V1$, P is an estimate of the station collision probability, and J is an estimate of average number of stations in collision.

In controller 503, a fragment size $\tilde{x}1^{(RTS-CTS)}$ for the first transmission rate V1 and request-to-send/clear-to-send data transmission mechanism is determined by means of the estimate of the bit error rate $\alpha_{z,V1}$ for the first transmission rate V1, estimates of the average number of idle slots between two successive transmissions in the network, station collision probability and the average number of stations in a collision.

Fragment size $\tilde{x}1^{(RTS-CTS)}$ for the first transmission rate V1 and request-to-send/clear-to-send transmission mechanism is determined by the formula $$\tilde{x}1^{(RTS-CTS)} = \begin{cases} x_{\max}, & x1^{(RTS-CTS)} \geq x_{\max}, \\ 8 \cdot ceil\{x_{\max}/(8 \cdot g1^{(RTS-CTS)})\}, & \text{else,} \end{cases}$$

where $x_{max}$ is a size of a data unit, $g1^{(RTS-CTS)} = \text{round}\{x_{max}/x1^{(RTS-CTS)}\}$, round{ } is a rounding operation to the nearest integer, ceil{ } in a rounding up operation, $x1^{(RTS-CTS)} = (c_{V1,N}/2) \cdot (\sqrt{1+4/(c_{V1,N} \cdot \alpha_{z,V1})} - 1)$, $c_{V1,N} = \tau_{V1}^{(Frame)}/t_{V1} + (\tau_{V1}^{(RTS-CTS)}/t_{V1}) \cdot (1+P/(J \cdot (1-P)))$, $\tau_{V1}^{(RTS-CTS)} = c_{11} \cdot s + c_{12} + c_{13} \cdot t_{V1}$, $\tau_{V1}^{(Frame)} = c_{14} + c_{15} \cdot t_{V1}$, $c_{11}$=const is a constant value equal to 20, $c_{12}$=const is a constant value equal to 444, $c_{13}$=const is a constant value equal to 272, $c_{14}$=const is a constant value equal to 404, and $c_{15}$=const is a constant value equal to 336, s is an estimate of average number of idle slots between two successive transmissions in the network, $t_{V1} = 1/V1$, P is an estimate of the station collision probability, and J is an estimate of average number of stations in collision.

In controller 503, a value of the network throughput $W1^{(RTS-CTS)}$ for the first transmission rate V1 and request-to-send/clear-to-send data transmission mechanism is determined by means of the estimate of the bit error rate $\alpha_{z,V1}$ for the first transmission rate V1, fragment size $\tilde{x}1^{(RTS-CTS)}$ for the first transmission rate V1 and the request-to-send/clear-to-send data transmission mechanism, estimates of average number of idle slots between two successive transmissions in the network, and station collision probability and average number of stations in a collision.

A value of the network throughput $W1^{(RTS-CTS)}$ for the first transmission rate V1 and the request-to-send/clear-to-send transmission mechanism is determined by the formula $$W1^{(RTS-CTS)} = \frac{\tilde{x}1^{(RTS-CTS)} \cdot (1-\alpha_{z,V1})^{\tilde{x}1^{(RTS-CTS)}}}{\tilde{x}1^{(RTS-CTS)} \cdot t_{V1} + \tau_{V1}^{(Frame)} + \tau_{V1}^{(RTS-CTS)} \cdot (1+P/(J \cdot (1-P)))},$$

where $\tau_{V1}^{(RTS-CTS)} = c_{11} \cdot s + c_{12} + c_{13} \cdot t_{V1}$, $\tau_{V1}^{(Frame)} = c_{14} + c_{15} \cdot t_{V1}$, $c_{11}$=const is a constant value equal to 20, $c_{12}$=const is a constant value equal to 444, $c_{13}$=const is a constant value equal to 272, $c_{14}$=const is a constant value equal to 404, and $c_{15}$=const is a constant value equal to 336, s is an estimate of average number of idle slots between two successive transmissions in the network, $t_{V1} = 1/V1$, P is an estimate of the station collision probability, and J is an estimate of average number of stations in collision.

In controller 503, a value of the network throughput $W1^{(max)}$ for the first transmission rate V1 is determined as a maximal value from the value of the network throughput $W1^{(Basic)}$ for the first transmission rate V1 and the basic data transmission mechanism and the value of the network throughput $W1^{(RTS-CTS)}$ for the first transmission rate V1 and the request-to-send/clear-to-send data transmission mechanism.

L2 data units, where L2 is greater than or equal to 1, are transmitted from the transmitting station to a receiving station using a basic data transmission mechanism, second transmission rate V2 and such a fragment size, and the same for all L2 data units so that one data unit contain two or more fragments and first two fragments of each data unit have the same size.

Data units are applied to the input of data unit storage node 505. Sizes of L2 data units are transmitted from the first output of data unit storage node 505 to the second input of controller 503. Such a fragment size is selected for L2 data units in controller 503 that one data unit to contain 2 or more fragments and two first fragments of each data unit to have the same size. That can be done by selecting the fragment size to be approximately equal to half size of a data unit which has the minimal size among L2 data units. The selected fragment size is transmitted from the second output of the controller to the first input of the fragmentation unit.

Information about a basic data transmission mechanism selected in controller 503 for transmission of L2 data units is applied from the third output of controller to the third input of transmitter 511. Information about the second transmission rate V2 (2 Mbps) selected in controller 503 for transmission of L2 data units is applied from the first output of controller 503 to the first input of transmitter 511.

The next data unit is applied from the second output of data unit storage node 505 to the second input of fragmentation unit 507 and then it is excluded from data unit storage node 505. Fragmentation of the next data unit is performed in fragmentation unit 507 by means of the information about the selected fragment size. A set of fragments of a data unit applies from the output of fragmentation unit 507 to the first input of data unit fragment storage node 509.

The next fragment of a data unit is applied from the output of data unit fragment storage node 509 to the second input of transmitter 511. In transmitter 511, an MPDU is formed from the applied fragment of the data unit, the MPDU is prepended by a PLCP preamble and PLCP header and transmitted from the output of transmitter 511 to the receiving station. If the MPDU is received without errors on the receiving station, an acknowledgement is transmitted from the receiving station to the transmitting station. If the acknowledgement is received without errors at the transmitting station, it applies to the input of receiver 501, from which second output it applies to the third input of controller 503, from which fourth output it applies to the second input of data unit fragment storage node 509. In receiving the acknowledgement for the fragment, this fragment is excluded from data unit fragment storage node 509.

If the MPDU is received with errors at the receiver station or an acknowledgement is received with errors on the transmitting station, the fragment is not excluded from data unit fragment storage node 509 and is transmitted again.

Acknowledgements for transmissions of all fragments of L2 data units received without errors on the receiving stations are received on the transmitting station by the above described method.

In controller 503, bit error rate $\alpha_{z,V2}$ for the second transmission rate V2 is estimated in the transmitted data units of the transmitting station using an information about number of acknowledgements received after transmission of L2 data units.

To obtain a bit error rate $\alpha_{z,V2}$ for the second transmission rate V2 at the transmitting station number $L2_{ACK,2}$ of acknowledgements of receiving of the second fragments transmitted after error-free receiving of the first fragments in the transmission of L2 data units is calculated, bit error rate $\alpha_{z,V2}$ for the second transmission rate V2 is determined using the second fragments of L2 transmitted data units by the formula $$\alpha_{z,V2} = 1 - \left(\frac{L2_{ACK,2}}{L2}\right)^{1/x},$$

where x is a fragment size.

To obtain the bit error rate $\alpha_{z,V2}$ for the second transmission rate V2 at the transmitting station, number $L2_{ACK,1}$ of acknowledgements of the receiving of the first fragments in the transmission of L2 data units is calculated, bit error rate $\alpha_{z,V2}$ for the second transmission rate V2 is determined using the first fragments of L2 transmitted data units by the formula $$\alpha_{z,V2} = 1 - \left(\frac{L2_{ACK,2}}{L2 \cdot (1-P)}\right)^{1/x},$$

where P is an estimate of the station collision probability, x is a fragment size.

To obtain the bit error rate $\alpha_{z,V2}$ for the second transmission rate V2 at the transmitting station, bit error rate $\alpha_{z,V2}$ for the second transmission rate V2 is determined using the second fragments of L2 transmitted data units, bit error rate $\alpha_{z,V2}$ for the second transmission rate V2 is determined using the first fragments of L2 transmitted data units, bit error rate $\alpha_{z,V2}$ for the second transmission rate V2 obtained by means of the first and second fragments of L2 transmitted data units are averaged.

In controller 503, a fragment size $\tilde{x}2^{(Basic)}$ is determined for the second transmission rate V2 and the basic data transmission mechanism using an estimate of the bit error rate $\alpha_{z,V2}$ for the second transmission rate V2 and the estimate of the average number of idle slots between two successive transmissions in a network.

Fragment size $\tilde{x}2^{(Basic)}$ for the second transmission rate V2 and basic transmission mechanism is determined by the formula $$\tilde{x}2^{(Basic)} = \begin{cases} x_{\max}, & x2^{(Basic)} \geq x_{\max}, \\ 8 \cdot ceil\{x_{\max}/(8 \cdot g2^{(Basic)})\}, & \text{else}, \end{cases}$$

where $x_{max}$ is a size of a data unit, $g2^{(Basic)} = \text{round}\{x_{max}/x2^{(Basic)}\}$, round{ } means a rounding to the nearest integer, ceil{ } is a rounding up operation, $x2^{(Basic)} = (b_{V2}/2)(\sqrt{1+4/(b_{V2} \cdot \alpha_{z,V2})}-1)$, $b_{V2} = \tau_{V2}/t_{V2}$, $\tau_{V2} = c_8 \cdot s + c_9 + c_{10} \cdot t_{V2}$, $c_8$=const is a constant value equal to 20, $c_9$=const is a constant value equal to 444, and $c_{10}$=const is a constant value equal to 336, s is an estimate of the average number of idle slots between two successive transmissions in the network, and $t_{V2} = 1/V2$.

In controller 503, a value of the network throughput $W2^{(Basic)}$ for the second transmission rate V2 and basic data transmission mechanism are determined by means of the estimate of bit error rate $\alpha_{z,V2}$ for the second transmission rate V2, frame size $\tilde{x}2^{(Basic)}$ for the second transmission rate V2 and the basic data transmission mechanism, estimates of the average number of idle slots between two successive transmissions in the network, and station collision probability and the average number of stations in a collision.

A value of the network throughput $W2^{(Basic)}$ for the second transmission rate V2 and basic transmission mechanism is determined by the formula $$W2^{(Basic)} = \tilde{x}2^{(Basic)} \cdot (1-\alpha_{z,V2})^{\tilde{x}2^{(Basic)}} / ((\tilde{x}2^{(Basic)} \cdot t_{V2} + \tau_{V2}) \cdot (1+P/(J \cdot (1-P)))),$$

where $\tau_{V2} = c_8 \cdot s + c_9 + c_{10} \cdot t_{V2}$, $c_8$=const is a constant value equal to 20, $c_9$=const is a constant value equal to 444, and $c_{10}$=const is a constant value equal to 336, s is an estimate of average number of idle slots between two successive transmissions in the network, $t_{V2}=1/V2$, P is an estimate of the station collision probability, and J is an estimate of average number of stations in collision.

In controller 503, a fragment size $\tilde{x}2^{(RTS-CTS)}$ for the second transmission rate V2 and request-to-send/clear-to-send data transmission mechanism is determined by means of the estimate of the bit error rate $\alpha_{z,V2}$ for the second transmission rate V2, estimates of the average number of idle slots between two successive transmissions in the network, station collision probability and the average number of stations in a collision.

Fragment size $\tilde{x}2^{(RTS-CTS)}$ for the second transmission rate V2 and request-to-send/clear-to-send transmission mechanism is determined by the formula $$\tilde{x}2^{(RTS-CTS)} = \begin{cases} x_{\max}, & x2^{(RTS-CTS)} \geq x_{\max}, \\ 8 \cdot ceil\{x_{\max}/(8 \cdot g2^{(RTS-CTS)})\}, & else, \end{cases}$$

where $x_{max}$ is a size of a data unit, $g2^{(RTS-CTS)}$=round$\{x_{max}/x2^{(RTS-CTS)}\}$, round$\{\ \}$ is a rounding operation to the nearest integer, ceil$\{\ \}$ in a rounding up operation, $$x2^{(RTS-CTS)} = (c_{V2,N}/2) \cdot (\sqrt{1+4/(c_{V2,N} \cdot \alpha_{z,V2})} - 1),$$

$$c_{V2,N} = \tau_{V2}^{(Frame)}/t_{V2} + (\tau_{V2}^{(RTS-CTS)}/t_{V2}) \cdot (1+P/(J \cdot (1-P))),$$

$\tau_{V2}^{(RTS-CTS)} = c_{11} \cdot s + c_{12} + c_{13} \cdot t_{V2}$, $\tau_{V2}^{(Frame)} = c_{14} + c_{15} \cdot t_{V2}$, $c_{11}$=const is a constant value equal to 20, $c_{12}$=const is a constant value equal to 444, $c_{13}$=const is a constant value equal to 272, $c_{14}$=const is a constant value equal to 404, and $c_{15}$=const is a constant value equal to 336, s is an estimate of average number of idle slots between two successive transmissions in the network, $t_{V2}=1/V2$, P is an estimate of the station collision probability, and J is an estimate of average number of stations in collision.

In controller 503, a value of the network throughput $W2^{(RTS-CTS)}$ for the second transmission rate V2 and request-to-send/clear-to-send data transmission mechanism is determined by means of the estimate of the bit error rate $\alpha_{z,V2}$ for the second transmission rate V2, fragment size $\tilde{x}2^{(RTS-CTS)}$ for the second transmission rate V2 and the request-to-send/clear-to-send data transmission mechanism, estimates of the average number of idle slots between two successive transmissions in the network, station collision probability and the average number of stations in a collision.

A value of the network throughput $W2^{(RTS-CTS)}$ for the second transmission rate V2 and the request-to-send/clear-to-send transmission mechanism is determined by the formula $$W2^{(RTS-CTS)} = \frac{\tilde{x}2^{(RTS-CTS)} \cdot (1-\alpha_{z,V2})^{\tilde{x}2^{(RTS-CTS)}}}{\tilde{x}2^{(RTS-CTS)} \cdot t_{V2} + \tau_{V2}^{(Frame)} + \tau_{V2}^{(RTS-CTS)} \cdot (1+P/(J \cdot (1-P)))},$$

where $\tau_{V2}^{(RTS-CTS)} = c_{11} \cdot s + c_{12} + c_{13} \cdot t_{V2}$, $\tau_{V2}^{(Frame)} = c_{14} + c_{15} \cdot t_{V2}$, $c_{11}$=const is a constant value equal to 20, $c_{12}$=const is a constant value equal to 444, $c_{13}$=const is a constant value equal to 272, $c_{14}$=const is a constant value equal to 404, and $c_{15}$=const is a constant value equal to 336, s is an estimate of average number of idle slots between two successive transmissions in the network, $t_{V2}=1/V2$, P is an estimate of the station collision probability, and J is an estimate of average number of stations in collision.

In controller 503, a value of the network throughput $W2^{(max)}$ for the second transmission rate V2 is determined as a maximal value from the value of the network throughput $W2^{(Basic)}$ for the second transmission rate V2 and the basic data transmission mechanism and the value of the network throughput $W2^{(RTS-CTS)}$ for the second transmission rate V2 and the request-to-send/clear-to-send data transmission mechanism.

In controller 503, the value of the network throughput $W1^{(max)}$ for the first transmission rate V1 and the value of the network throughput $W2^{(max)}$ for the second transmission rate V2 are compared. If the value of the network throughput $W1^{(max)}$ for the first transmission rate V1 is greater than or equal to the value of the network throughput $W2^{(max)}$ for the second transmission rate V2, the first transmission rate V1 is selected for data transmission.

Information about transmission rate V1 (1 Mbps) selected in controller 503 applies from the first output of controller 503 to the first input of transmitter 511.

The value of the network throughput $W1^{(Basic)}$ for the first transmission rate V1 and the basic transmission mechanism and the value of the network throughput $W1^{(RTS-CTS)}$ for the first transmission rate V1 and the request-to-send/clear-to-send data transmission mechanism are compared. If the value of the network throughput $W1^{(Basic)}$ for the first transmission rate V1 and the basic transmission mechanism is greater than or equal to the value of the network throughput $W1^{(RTS-CTS)}$ for the first transmission rate V1 and the request-to-send/clear-to-send data transmission mechanism, the basic transmission mechanism and fragment size $\tilde{x}1^{(Basic)}$ for the first transmission rate V1 and basic transmission mechanism is selected for data transmission, otherwise, the request-to-send/clear-to-send data transmission mechanism and fragment size $\tilde{x}1^{(RTS-CTS)}$ for the first transmission rate V1 and request-to-send/clear-to-send data transmission mechanism is selected for data transmission.

Information about the basic transmission mechanism selected in controller 503 is applied from the third output of controller 503 to the third input of transmitter 511. Information about the selected size of a fragment is applied from the second output of the controller to the first input of the fragmentation unit. If the value of the network throughput $W1^{(max)}$ for the first transmission rate V1 is less than the value of the network throughput $W2^{(max)}$ for the second transmission rate V2, then L3 data units, where L3 is greater than or equal to 1, are transmitted from the transmitting station to a receiving station using a basic data transmission mechanism, third transmission rate V3 and such a fragment size, the same for all L3 data units so that one data unit contain two or more fragments and first two fragments of each data unit have the same size.

Data units are applied to the input of data unit storage node 505. Sizes of L3 data units are transmitted from the first output of data unit storage node 505 to the second input of controller 503. Such a fragment size is selected for L3 data units in controller 503 that one data unit to contain 2 or more fragments and two first fragments of each data unit to have the same size. That can be done by selecting the fragment size to be approximately equal to half size of a data unit which has the minimal size among L3 data units. The selected fragment size is transmitted from the second output of the controller to the first input of the fragmentation unit.

Information about a basic data transmission mechanism selected in controller 503 for transmission of L3 data units is applied from the third output of controller to the third input of transmitter 511. Information about the third transmission rate V3 (5.5 Mbps) selected in controller 503 for transmission of L3 data units is applied from the first output of controller 503 to the first input of transmitter 511.

The next data unit is applied from the second output of data unit storage node 505 to the second input of fragmentation unit 507 and then it is excluded from data unit storage node 505. Fragmentation of the next data unit is performed in fragmentation unit 507 by means of the information about the selected fragment size. A set of fragments of a data unit applies from the output of fragmentation unit 507 to the first input of data unit fragment storage node 509.

The next fragment of a data unit is applied from the output of data unit fragment storage node 509 to the second input of transmitter 511. In transmitter 511, an MPDU is formed from the applied fragment of the data unit, the MPDU is prepended by a PLCP preamble and PLCP header and transmitted from the output of transmitter 511 to the receiving station. If the MPDU is received without errors on the receiving station, an acknowledgement is transmitted from the receiving station to the transmitting station. If the acknowledgement is received without errors on the transmitting station, it applies to the input of receiver 501, from which second output it applies to the third input of controller 503, from which fourth output it applies to the second input of data unit fragment storage node 509. In receiving the acknowledgement for the fragment, this fragment is excluded from data unit fragment storage node 509.

If the MPDU is received with errors on the receiver station or an acknowledgement is received with errors on the transmitting station, the fragment is not excluded from data unit fragment storage node 509 and is transmitted again. Acknowledgements for transmissions of all fragments of L3 data units received without errors on the receiving stations are received on the transmitting station by the above described method.

In controller 503, bit error rate $\alpha_{z,V3}$ for the third transmission rate V3 is estimated in the transmitted data units of the transmitting station using an information about number of acknowledgements received after transmission of L3 data units.

To obtain a bit error rate $\alpha_{z,V3}$ for the third transmission rate V3 at the transmitting station the number $L3_{ACK,2}$ of acknowledgements of receiving of the second fragments transmitted after error-free receiving of the first fragments in the transmission of L3 data units is calculated, bit error rate $\alpha_{z,V3}$ for the third transmission rate V3 is determined using the second fragments of L3 transmitted data units by the formula $$\alpha_{z,V3} = 1 - \left(\frac{L3_{ACK,2}}{L3}\right)^{1/x},$$

where x is a fragment size.

To obtain the bit error rate $\alpha_{z,V3}$ for the third transmission rate V3 at the transmitting station, the number $L3_{ACK,1}$ of acknowledgements of the receiving of the first fragments in the transmission of L3 data units is calculated, bit error rate $\alpha_{z,V3}$ for the third transmission rate V3 is determined using the first fragments of L3 transmitted data units by the formula $$\alpha_{z,V3} = 1 - \left(\frac{L3_{ACK,2}}{L3\cdot(1-P)}\right)^{1/x},$$

where P is an estimate of the station collision probability, and x is a fragment size.

To obtain the bit error rate $\alpha_{z,V3}$ for the third transmission rate V3 at the transmitting station, bit error rate $\alpha_{z,V3}$ for the third transmission rate V3 is determined using the second fragments of L3 transmitted data units, bit error rate $\alpha_{z,V3}$ for the third transmission rate V3 is determined using the first fragments of L3 transmitted data units, bit error rate $\alpha_{z,V3}$ for the third transmission rate V3 obtained by means of the first and second fragments of L3 transmitted data units are averaged.

In controller 503, a fragment size $\tilde{x}3^{(Basic)}$ is determined for the third transmission rate V3 and the basic data transmission mechanism using an estimate of the bit error rate $\alpha_{z,V3}$ for the third transmission rate V3 and the estimate of the average number of idle slots between two successive transmissions in a network.

Fragment size $\tilde{x}3^{(Basic)}$ for the third transmission rate V3 and basic transmission mechanism is determined by the formula $$\tilde{x}3^{(Basic)} = \begin{cases} x_{max}, & x3^{(Basic)} \geq x_{max}, \\ 8\cdot ceil\{x_{max}/(8\cdot g3^{(Basic)})\}, & else, \end{cases}$$

where $x_{max}$ is a size of a data unit, $g3^{(Basic)}$=round$\{x_{max}/x3^{(Basic)}\}$, round$\{\ \}$ means a rounding to the nearest integer, ceil$\{\ \}$ is a rounding up operation, $x3^{(Basic)}$=$(b_{V3}/2)\cdot(\sqrt{1+4/(b_{V3}\cdot\alpha_{z,V3})}-1)$, $b_{V3}=\tau_{V3}/t_{V3}$, $\tau_{V3}=c_8\cdot s+c_9+c_{10}\cdot t_{V3}$, $c_8$=const is a constant value equal to 20, $c_9$=const is a constant value equal to 444, and $c_{10}$=const is a constant value equal to 336, s is an estimate of average number of idle slots between two successive transmissions in the network, and $t_{V3}$=1/V3.

In controller 503, a value of the network throughput $W3^{(Basic)}$ for the third transmission rate V3 and basic data transmission mechanism are determined by means of the estimate of bit error rate $\alpha_{z,V3}$ for the third transmission rate V3, frame size $\tilde{x}3^{(Basic)}$ for the third transmission rate V3 and the basic data transmission mechanism, estimates of the average number of idle slots between two successive transmissions in the network, station collision probability and the average number of stations in a collision.

A value of the network throughput $W3^{(Basic)}$ for the third transmission rate V3 and basic transmission mechanism is determined by the formula $W3^{(Basic)}=\tilde{x}3^{(Basic)}\cdot(1-\alpha_{z,V3})^{\tilde{x}3^{(Basic)}}/((\tilde{x}3^{(Basic)}\cdot t_{V3}+\tau_{V3})\cdot(1+P/(J\cdot(1-P))))$, where $\tau_{V3}=c_8\cdot s+c_9+c_{10}\cdot t_{V3}$, $c_8$=const is a constant value equal to 20, $c_9$=const is a constant value equal to 444, and $c_{10}$=const is a constant value equal to 336, s is an estimate of average number of idle slots between two successive transmissions in the network, $t_{V3}$=1/V3, P is an estimate of the station collision probability, and J is an estimate of the average number of stations in collision.

In controller 503, a fragment size $\tilde{x}3^{(RTS-CTS)}$ for the third transmission rate V3 and request-to-send/clear-to-send data transmission mechanism is determined by means of the estimate of the bit error rate $\alpha_{z,V3}$ for the third transmission rate V3, estimates of the average number of idle slots between two successive transmissions in the network, station collision probability and the average number of stations in a collision.

Fragment size $\tilde{x}3^{(RTS-CTS)}$ for the third transmission rate V3 and request-to-send/clear-to-send transmission mechanism is determined by the formula $$\tilde{x}3^{(RTS-CTS)} = \begin{cases} x_{\max}, & x3^{(RTS-CTS)} \geq x_{\max}, \\ 8 \cdot ceil\{x_{\max}/(8 \cdot g3^{(RTS-CTS)})\}, & \text{else}, \end{cases}$$

where $x_{max}$ is a size of a data unit, $g3^{(RTS-CTS)}$=round$\{x_{max}/x3^{(RTS-CTS)}\}$, round{ } is a rounding operation to the nearest integer, ceil{ } in a rounding up operation, $$x3^{(RTS-CTS)}=(c_{V3,N}/2)\cdot(\sqrt{1+4/(c_{V3,N}\cdot\alpha_{z,V3})}-1),$$

$$c_{V3,N}=\tau_{V3}^{(Frame)}/t_{V3}+(\tau_{V3}^{(RTS-CTS)}/t_{V3})\cdot(1+P/(J\cdot(1-P))),$$

$\tau_{V3}^{(RTS-CTS)}=c_{11}\cdot s+c_{12}+c_{13}\cdot t_{V3}$, $\tau_{V3}^{(Frame)}=c_{14}+c_{15}\cdot t_{V3}$, $c_{11}$=const is a constant value equal to 20, $c_{12}$=const is a constant value equal to 444, $c_{13}$=const is a constant value equal to 272, $c_{14}$=const is a constant value equal to 404, and $c_{15}$=const is a constant value equal to 336, s is an estimate of the average number of idle slots between two successive transmissions in the network, $t_{V3}$=1/V3, P is an estimate of the station collision probability, and J is an estimate of the average number of stations in collision.

In controller 503, a value of the network throughput $W3^{(RTS-CTS)}$ for the third transmission rate V3 and request-to-send/clear-to-send data transmission mechanism is determined by means of the estimate of the bit error rate $\alpha_{z,V3}$ for the third transmission rate V3, fragment size $\tilde{x}3^{(RTS-CTS)}$ for the third transmission rate V3 and the request-to-send/clear-to-send data transmission mechanism, estimates of the average number of idle slots between two successive transmissions in the network, station collision probability and the average number of stations in a collision.

A value of the network throughput $W3^{(RTS-CTS)}$ for the third transmission rate V3 and the request-to-send/clear-to-send transmission mechanism is determined by the formula $$W3^{(RTS-CTS)} = \frac{\tilde{x}3^{(RTS-CTS)} \cdot (1-\alpha_{z,V3})^{\tilde{x}3^{(RTS-CTS)}}}{\tilde{x}3^{(RTS-CTS)} \cdot t_{V3} + \tau_{V3}^{(Frame)} + \tau_{V3}^{(RTS-CTS)} \cdot (1+P/(J\cdot(1-P)))},$$

where $\tau_{V3}^{(RTS-CTS)}=c_{11}\cdot s+c_{12}+c_{13}\cdot t_{V3}$, $\tau_{V3}^{(Frame)}=c_{14}+c_{15}\cdot t_{V3}$, $c_{11}$=const is a constant value equal to 20, $c_{12}$=const is a constant value equal to 444, $c_{13}$=const is a constant value equal to 272, $c_{14}$=const is a constant value equal to 404, and $c_{15}$=const is a constant value equal to 336, s is an estimate of the average number of idle slots between two successive transmissions in the network, $t_{V3}$=1/V3, P is an estimate of the station collision probability, and J is an estimate of the average number of stations in collision.

In controller 503, a value of the network throughput $W3^{(max)}$ for the third transmission rate V3 is determined as a maximal value from the value of the network throughput $W3^{(Basic)}$ for the third transmission rate V3 and the basic data transmission mechanism and the value of the network throughput $W3^{(RTS-CTS)}$ for the third transmission rate V3 and the request-to-send/clear-to-send data transmission mechanism.

In controller 503, the value of the network throughput $W2^{(max)}$ for the second transmission rate V2 and the value of the network throughput $W3^{(max)}$ for the third transmission rate V3 are compared. If the value of the network throughput $W2^{(max)}$ for the second transmission rate V2 is more than or equal to the value of the network throughput $W3^{(max)}$ for the third transmission rate V3, the second transmission rate V2 is selected for data transmission. Information about the second transmission rate V2 (2 Mbps) selected in controller 503 is applied from the first output of controller 503 to the first input of transmitter 511.

The value of the network throughput $W2^{(Basic)}$ for the second transmission rate V2 and the basic transmission mechanism and the value of the network throughput $W2^{(RTS-CTS)}$ for the second transmission rate V2 and the request-to-send/clear-to-send data transmission mechanism are compared. If the value of the network throughput $W2^{(Basic)}$ for the second transmission rate V2 and the basic transmission mechanism is greater than or equal to the value of the network throughput $W2^{(RTS-CTS)}$ for the second transmission rate V2 and the request-to-send/clear-to-send data transmission mechanism, the basic transmission mechanism and fragment size $\tilde{x}2^{(Basic)}$ for the second transmission rate V2 and basic transmission mechanism is selected for data transmission, otherwise, the request-to-send/clear-to-send data transmission mechanism and fragment size $\tilde{x}2^{(RTS-CTS)}$ for the second transmission rate V2 and request-to-send/clear-to-send data transmission mechanism is selected for data transmission.

Information about a transmission mechanism selected in controller 503 is applied from the third output of controller 503 to the third input of transmitter 511. Information about the selected fragment size is applied from the second output of the controller to the first input of the fragmentation unit.

If the value of the network throughput $W2^{(max)}$ for the second transmission rate V2 is less than the value of the network throughput $W3^{(max)}$ for the third transmission rate V3, then L4 data units, where L4 is more or equal to 1, are transmitted from the transmitting station to a receiving station using a basic data transmission mechanism, fourth transmission rate V4 and such a fragment size, the same for all L4 data units so that one data unit contain two or more fragments and first two fragments of each data unit have the same size.

Data units are applied to the input of data unit storage node 505. Sizes of L4 data units are transmitted from the first output of data unit storage node 505 to the second input of controller 503. Such a fragment size is selected for L4 data units in controller 503 that one data unit to contain 2 or more fragments and two first fragments of each data unit to have the same size. That can be done by selecting the fragment size to be approximately equal to half size of a data unit which has the minimal size among L4 data units. The selected fragment size is transmitted from the second output of the controller to the first input of the fragmentation unit.

Information about a basic data transmission mechanism selected in controller 503 for transmission of L4 data units is applied from the third output of controller to the third input of transmitter 511. Information about the fourth transmission rate V4 (11 Mbps) selected in controller 503 for transmission of L4 data units is applied from the first output of controller 503 to the first input of transmitter 511.

The next data unit is applied from the second output of data unit storage node 505 to the second input of fragmentation unit 507 and then it is excluded from data unit storage node 505. Fragmentation of the next data unit is performed in fragmentation unit 507 by means of the information about the selected fragment size. A set of fragments of a data unit applies from the output of fragmentation unit 507 to the first input of data unit fragment storage node 509.

The next fragment of a data unit is applied from the output of data unit fragment storage node 509 to the second input of transmitter 511. In transmitter 511, an MPDU is formed from the applied fragment of the data unit, the MPDU is prepended by a PLCP preamble and PLCP header and transmitted from the output of transmitter 511 to the receiving station.

If the MPDU is received without errors at the receiving station, an acknowledgement is transmitted from the receiving station to the transmitting station. If the acknowledgement is received without errors on the transmitting station, it applies to the input of receiver 501, from which second output it applies to the third input of controller 503, from which fourth output it applies to the second input of data unit fragment storage node 509. In receiving the acknowledgement for the fragment, this fragment is excluded from data unit fragment storage node 509.

If the MPDU is received with errors at the receiver station or an acknowledgement is received with errors on the transmitting station, the fragment is not excluded from data unit fragment storage node 509 and is transmitted again.

Acknowledgements for transmissions of all fragments of L4 data units received without errors on the receiving stations are received at the transmitting station by the above described method.

In controller 503, bit error rate $\alpha_{z,V4}$ for the fourth transmission rate V4 is estimated in the transmitted data units of the transmitting station using an information about number of acknowledgements received after transmission of L4 data units.

To obtain a bit error rate $\alpha_{z,V4}$ for the fourth transmission rate V4 at the transmitting station number $L4_{ACK,2}$ of acknowledgements of receiving of the second fragments transmitted after error-free receiving of the first fragments in the transmission of L4 data units is calculated, bit error rate $\alpha_{z,V4}$ for the fourth transmission rate V4 is determined using the second fragments of L4 transmitted data units by the formula $$\alpha_{z,V4} = 1 - \left(\frac{L4_{ACK,2}}{L4}\right)^{1/x},$$

where x is a fragment size.

To obtain the bit error rate $\alpha_{z,V4}$ for the fourth transmission rate V4 at the transmitting station, number $L4_{ACK,1}$ of acknowledgements of the receiving of the first fragments in the transmission of L4 data units is calculated, bit error rate $\alpha_{z,V4}$ for the fourth transmission rate V4 is determined using the first fragments of L4 transmitted data units by the formula $$\alpha_{z,V4} = 1 - \left(\frac{L4_{ACK,2}}{L4\cdot(1-P)}\right)^{1/x},$$

where P is an estimate of the station collision probability, and x is a fragment size.

To obtain the bit error rate $\alpha_{z,V4}$ for the fourth transmission rate V4 at the transmitting station, bit error rate $\alpha_{z,V4}$ for the fourth transmission rate V4 is determined using the second fragments of L4 transmitted data units, bit error rate $\alpha_{z,V4}$ for the fourth transmission rate V4 is determined using the first fragments of L4 transmitted data units, and bit error rate $\alpha_{z,V4}$ for the fourth transmission rate V4 obtained by means of the first and second fragments of L4 transmitted data units are averaged.

In controller 503, a fragment size $\tilde{x}4^{(Basic)}$ is determined for the fourth transmission rate V4 and the basic data transmission mechanism using an estimate of the bit error rate $\alpha_{z,V4}$ for the fourth transmission rate V4 and the estimate of average number of idle slots between two successive transmissions in a network.

Fragment size $\tilde{x}4^{(Basic)}$ for the fourth transmission rate V4 and basic transmission mechanism is determined by the formula $$\tilde{x}4^{(Basic)} = \begin{cases} x_{\max}, & x4^{(Basic)} \geq x_{\max}, \\ 8\cdot ceil\{x_{\max}/(8\cdot g4^{(Basic)})\}, & \text{else,} \end{cases}$$

where $x_{max}$ is a size of a data unit, $g4^{(Basic)}=\text{round}\{x_{max}/x4^{(Basic)}\}$, round{ } means a rounding to the nearest integer, ceil{ } is a rounding up operation, $x4^{(Basic)}=(b_{V4}/2)\cdot(\sqrt{1+4/(b_{V4}\cdot\alpha_{z,V4})}-1)$, $b_{V4}=\tau_{V4}/t_{V4}$, $\tau_{V4}=c_8\cdot s+c_9+c_{10}\cdot t_{V4}$, $c_8$=const is a constant value equal to 20, $c_9$=const is a constant value equal to 444, and $c_{10}$=const is a constant value equal to 336, s is an estimate of average number of idle slots between two successive transmissions in the network, and $t_{V4}=1/V4$.

In controller 503, a value of the network throughput $W4^{(Basic)}$ for the fourth transmission rate V4 and basic data transmission mechanism are determined by means of the estimate of bit error rate $\alpha_{z,V4}$ for the fourth transmission rate V4, frame size $\tilde{x}4^{(Basic)}$ for the fourth transmission rate V4 and the basic data transmission mechanism, estimates of the average number of idle slots between two successive transmissions in the network, station collision probability and the average number of stations in a collision.

A value of the network throughput $W4^{(Basic)}$ for the fourth transmission rate V4 and basic transmission mechanism is determined by the formula $$W4^{(Basic)} = \tilde{x}4^{(Basic)}\cdot(1-\alpha_{z,V4})^{\tilde{x}4^{(Basic)}} / ((\tilde{x}4^{(Basic)}\cdot t_{V4}+\tau_{V4})\cdot(1+P/(J\cdot(1-P)))),$$

where $\tau_{V4}=c_8\cdot s+c_9+c_{10}\cdot t_{V4}$, $c_8$=const is a constant value equal to 20, $c_9$=const is a constant value equal to 444, and $c_{10}$=const is a constant value equal to 336, s is an estimate of the average number of idle slots between two successive transmissions in the network, $t_{V4}=1/V4$, P is an estimate of the station collision probability, and J is an estimate of the average number of stations in collision.

In controller 503, a fragment size $\tilde{x}4^{(RTS-CTS)}$ for the fourth transmission rate V4 and request-to-send/clear-to-send data transmission mechanism is determined by means of the estimate of the bit error rate $\alpha_{z,V4}$ for the fourth transmission rate V4, estimates of the average number of idle slots between two successive transmissions in the network, station collision probability and the average number of stations in a collision.

Fragment size $\tilde{x}4^{(RTS-CTS)}$ for the fourth transmission rate V4 and request-to-send/clear-to-send transmission mechanism is determined by the formula $$\tilde{x}4^{(RTS-CTS)} = \begin{cases} x_{\max}, & x4^{(RTS-CTS)} \geq x_{\max}, \\ 8\cdot ceil\{x_{\max}/(8\cdot g4^{(RTS-CTS)})\}, & \text{else,} \end{cases}$$

where $x_{max}$ is a size of a data unit, $g4^{(RTS-CTS)}=\text{round}\{x_{max}/x4^{(RTS-CTS)}\}$, round{ } is a rounding operation to the nearest integer, ceil{ } in a rounding up operation, $$x4^{(RTS-CTS)}=(c_{V4,N}/2)\cdot(\sqrt{1+4/(c_{V4,N}\cdot\alpha_{z,V4})}-1),$$

$$c_{V4,N} = \tau_{V4}^{(Frame)}/t_{V4} + (\tau_{V4}^{(RTS-CTS)}/t_{V4}) \cdot (1+P/(J \cdot (1-P))),$$

$\tau_{V4}^{(RTS-CTS)} = c_{11} \cdot s + c_{12} + c_{13} \cdot t_{V4}$, $\tau_{V4}^{(Frame)} = c_{14} + c_{15} \cdot t_{V4}$, $c_{11}$=const is a constant value equal to 20, $c_{12}$=const is a constant value equal to 444, $c_{13}$=const is a constant value equal to 272, $c_{14}$=const is a constant value equal to 404, and $c_{15}$=const is a constant value equal to 336, s is an estimate of the average number of idle slots between two successive transmissions in the network, $t_{V4}=1/V4$, P is an estimate of the station collision probability, and J is an estimate of the average number of stations in collision.

In controller 503, a value of the network throughput $W4^{(RTS-CTS)}$ for the fourth transmission rate V4 and request-to-send/clear-to-send data transmission mechanism is determined by means of the estimate of the bit error rate $\alpha_{z,V4}$ for the fourth transmission rate V4, fragment size $\tilde{x}4^{(RTS-CTS)}$ for the fourth transmission rate V4 and the request-to-send/clear-to-send data transmission mechanism, estimates of the average number of idle slots between two successive transmissions in the network, station collision probability and the average number of stations in a collision.

A value of the network throughput $W4^{(RTS-CTS)}$ for the fourth transmission rate V4 and the request-to-send/clear-to-send transmission mechanism is determined by the formula $$W4^{(RTS-CTS)} = \frac{\tilde{x}4^{(RTS-CTS)} \cdot (1-\alpha_{z,V4})^{\tilde{x}4^{(RTS-CTS)}}}{\tilde{x}4^{(RTS-CTS)} \cdot t_{V4} + \tau_{V4}^{(Frame)} + \tau_{V4}^{(RTS-CTS)} \cdot (1+P/(J \cdot (1-P)))},$$

where $\tau_{V4}^{(RTS-CTS)} = c_{11} \cdot s + c_{12} + c_{13} \cdot t_{V4}$, $\tau_{V4}^{(Frame)} = c_{14} + c_{15} \cdot t_{V4}$, $c_{11}$=const is a constant value equal to 20, $c_{12}$=const is a constant value equal to 444, $c_{13}$=const is a constant value equal to 272, $c_{14}$=const is a constant value equal to 404, and $c_{15}$=const is a constant value equal to 336, s is an estimate of the average number of idle slots between two successive transmissions in the network, $t_{V4}=1/V4$, P is an estimate of the station collision probability, and J is an estimate of the average number of stations in collision.

In controller 503, a value of the network throughput $W4^{(max)}$ for the fourth transmission rate V4 is determined as a maximal value from the value of the network throughput $W4^{(Basic)}$ for the fourth transmission rate V4 and the basic data transmission mechanism and the value of the network throughput $W4^{(RTS-CTS)}$ for the fourth transmission rate V4 and the request-to-send/clear-to-send data transmission mechanism.

In controller 503, the value of the network throughput $W3^{(max)}$ for the third transmission rate V3 and the value of the network throughput $W4^{(max)}$ for the fourth transmission rate V4 are compared. If the value of the network throughput $W3^{(max)}$ for the third transmission rate V3 is more than or equal to the value of the network throughput $W4^{(max)}$ for the fourth transmission rate V4, the third transmission rate V3 is selected for data transmission.

Information about the third transmission rate V3 (5.5 Mbps) selected in controller 503 is applied from the first output of controller 503 to the first input of transmitter 511.

The value of the network throughput $W3^{(Basic)}$ for the third transmission rate V3 and the basic transmission mechanism and the value of the network throughput $W3^{(RTS-CTS)}$ for the third transmission rate V3 and the request-to-send/clear-to-send data transmission mechanism are compared. If the value of the network throughput $W3^{(Basic)}$ for the third transmission rate V3 and the basic transmission mechanism is more or equal to the value of the network throughput $W3^{(RTS-CTS)}$ for the third transmission rate V3 and the request-to-send/clear-to-send data transmission mechanism, the basic transmission mechanism and fragment size $\tilde{x}3^{(Basic)}$ for the third transmission rate V3 and basic transmission mechanism is selected for data transmission, otherwise, the request-to-send/clear-to-send data transmission mechanism and fragment size $\tilde{x}3^{(RTS-CTS)}$ for the third transmission rate V3 and request-to-send/clear-to-send data transmission mechanism is selected for data transmission.

Information about a transmission mechanism selected in controller 503 is applied from the third output of controller 503 to the third input of transmitter 511. Information about the selected fragment size is fed from the second output of the controller to the first input of the fragmentation unit. If the value of the network throughput $W3^{(max)}$ for the third transmission rate V3 is less than the value of the network throughput $W4^{(max)}$ for the fourth transmission rate V4, the fourth transmission rate V4 is selected for data transmission. Information about the fourth transmission rate V4 (11 Mbps) selected in controller 503 is applied from the first output of controller 503 to the first input of transmitter 511.

The value of the network throughput $W4^{(Basic)}$ for the fourth transmission rate V4 and the basic transmission mechanism and the value of the network throughput $W4^{(RTS-CTS)}$ for the fourth transmission rate V4 and the request-to-send/clear-to-send data transmission mechanism are compared. If the value of the network throughput $W4^{(Basic)}$ for the fourth transmission rate V4 and the basic transmission mechanism is more or equal to the value of the network throughput $W4^{(RTS-CTS)}$ for the fourth transmission rate V4 and the request-to-send/clear-to-send data transmission mechanism, the basic transmission mechanism and fragment size $\tilde{x}4^{(Basic)}$ for the fourth transmission rate V4 and basic transmission mechanism is selected for data transmission, otherwise, the request-to-send/clear-to-send data transmission mechanism and fragment size $\tilde{x}4^{(RTS-CTS)}$ for the fourth transmission rate V4 and request-to-send/clear-to-send data transmission mechanism is selected for data transmission.

Information about a transmission mechanism selected in controller 503 is fed from the third output of controller 503 to the third input of transmitter 511. Information about the selected fragment size is applied from the second output of the controller to the first input of the fragmentation unit.

Data units are transmitted from the transmitting station to the receiving station using the selected transmission rate, data transmission mechanism and fragment size selected for this transmission rate. Data units are applied to the input of data unit storage node 505.

The next data unit is applied from the second output of data unit storage node 505 to the second input of fragmentation unit 507 and then it is excluded from data unit storage node 505. Fragmentation of the next data unit is performed in fragmentation unit 507 by means of the information about the selected fragment size. A set of fragments of a data unit applies from the output of fragmentation unit 507 to the first input of data unit fragment storage node 509.

The next fragment of a data unit is applied from the output of data unit fragment storage node 509 to the second input of transmitter 511. In transmitter 511, an MPDU is formed from the applied fragment of the data unit, the MPDU is prepended by a PLCP preamble and PLCP header and transmitted from the output of transmitter 511 to the receiving station. If the MPDU is received without errors at the receiving station, an acknowledgement is transmitted from the receiving station to the transmitting station. If the acknowledgement is received without errors on the transmitting station, it applies to the input of receiver 501, from which second output it applies to the third input of controller 503, from which fourth output it applies to the second input of data unit fragment storage node 509. In receiving the acknowledgement for the fragment. This fragment is excluded from data unit fragment storage node 509.

If the MPDU is received with errors at the receiver station or an acknowledgement is received with errors at the transmitting station, the fragment is not excluded from data unit fragment storage node 509 and is transmitted again.

The process of estimation of average number of idle slots between two successive transmissions in the network is executed periodically. As soon as a new estimate of average number of idle slots between two successive transmissions in the network appears, it is used to estimate number of active stations in the network, and its use is intended for estimation of station collision probability and estimation of average number of stations in collision.

In selecting the data transmission mechanism, the fragment size and/or transmission rate, the current (the latest in time) values of the estimate of average number of idle slots between two successive transmissions in the network, estimates of the station collision probability and estimate of average number of stations in collision are applied.

The process of data unit transmission from the transmitting station to the receiving station is performed as follows. Data units are fed to the input of data unit storage node 505. Before a data unit transmission, the obtained signal-to-noise ratio estimates are extrapolated in controller 503, thus obtaining the extrapolated signal-to-noise ratio estimate.

The extrapolated estimate of the signal-to-noise ratio is obtained by the formula $z(t_2)=z(t_1)$, where $z(t_2)$ is an estimate of the signal-to-noise ratio extrapolated at time $t_2$, $z(t_1)$ is an estimate of the signal-to-noise ratio obtained at the time $t_1$, $t_2$ is a time moment that coincides with the beginning of a data unit if only one estimate of the signal-to-noise ratio is obtained before beginning of the transmission of a data unit.

The extrapolated estimate of the signal-to-noise ratio is obtained by the formula $z(t_{L+1})=m_z+\exp\{-\lambda(t_{L+1}-t_L)\}\cdot[z(t_L)-m_z]$, where $z(t_{L+1})$ is an estimate of the signal-to-noise ratio extrapolated at time $t_{L+1}$, $z(t_L)$ is an estimate of the signal-to-noise ratio obtained at time $t_L$, $t_{L+1}$ is a time moment that coincides with the beginning of a data unit, $t_L$ is a time moment when the latest estimate of the signal-to-noise ratio is obtained, $L=\min\{I,J\}$, $I \geq 2$ is number of estimates of the signal-to-noise ratio obtained before the time moment $t_{L+1}$, $J \geq 2$ is an interpolation interval, i.e. the maximal number of estimates applied in interpolation, $$m_z = \frac{1}{L}\sum_{l=1}^{L} z(t_l),$$

$z(t_l)$ is an estimate of the signal-to-noise ratio obtained at time $t_l$, $$\lambda = \underset{\lambda}{\operatorname{argmin}}\left[\sum_{l=2}^{L}\left(\frac{(z(t_l)-m_z)(z(t_{l-1})-m_z)}{\sigma_z^2} - \exp\{-\lambda(t_l-t_{l-1})\}\right)^2\right],$$

$$\sigma_z^2 = \frac{1}{L}\sum_{l=1}^{L}[z(t_l)m_z]^2,$$

if more than one estimate of the signal-to-noise ratio is obtained before the beginning of the transmission of a data unit.

In controller 503, the optimal fragment size, optimal transmission rate and the respective value of network throughput is determined for the basic data transmission mechanism using the extrapolated signal-to-noise ratio estimate and station collision probability estimates and the average number of stations in collision.

The periodical estimation of the SNR in a signal of the transmitting station is performed as follows. Preliminary estimation of the SNR in a signal of the transmitting station is performed first and this estimate is then improved periodically. L data units, where L is greater than or equal to 1, are transmitted from the transmitting station to the receiving station using the basic data transmission mechanism, the most reliable transmission rate and a fragment size being equal for all L data units so that one data unit contains 2 or more fragments and two first fragments of each data unit has the same size. Data units are applied to the input of data unit storage node 505. Sizes of L data units are transmitted from the first output of data unit storage node 505 to the third input of controller 503. In controller 503, the fragment size is selected for L data units so that one data unit contains 2 or more fragments, and two first fragments of each data unit have equal size. This can be done by selecting the fragment size approximately equals to a half size of a data unit, which has the minimal size among L data units. The selected fragment size is transmitted from the second output of the controller to the first input of the fragmentation unit.

Information about the basic transmission mechanism selected in controller 503 for transmission of L data units is fed from the third output of controller 503 to the third input of transmitter 511.

Information about the most reliable transmission rate (1 Mbps) selected in controller 503 for transmission of L data units applies from the first output of controller 503 to the third input of transmitter 511.

The next data unit is applied from the second output of data unit storage node 505 to the second input of fragmentation unit 507, after that it is excluded from data unit storage node 505. In fragmentation unit 507 the next data unit is fragmented by means of information of the selected fragment size. A set of fragments of a data unit is applied from the output of fragmentation unit 507 to the first input of data unit fragment storage node 509.

The next fragment of a data unit is fed from the output of data unit fragment storage node to the second input of transmitter 511. In transmitter 511, an MPDU is formed from the arrived fragment of a data unit, the MPDU is prepended by a PLCP preamble and PLCP header and transmitted from the output of transmitter 511 to the receiving station.

If the MPDU is received without errors at the receiving station, an acknowledgement (ACK) is transmitted from the receiving station to the transmitting station. If the ACK is received without errors at the transmitting station, it applies to the input of receiver 501, and is fed from the third output of receiver 501 to the fourth input of controller 503; is applied from the fourth output of controller 503 to the second input of data unit fragment storage node 509. When having received the ACK for a fragment, this fragment is excluded from data unit fragment storage node 509.

If the MPDU is received with errors at the receiving station or the ACK is received with errors at the transmitting station, the fragment is not excluded from data unit fragment storage node 509 and is retransmitted.

Acknowledgments for all transmissions of all fragments of L data units received without errors on the receiving station are received on the transmitting station by the above described method.

On the transmitting station the SNR in a signal of the receiving station is estimated by the received ACKs in receiver 501.

The SNR in a signal of the receiving station is estimated on the transmitting station by any of the known methods. At the same time, ratio of the desired signal chip power to noise power is used as the SNR.

Estimates of the SNR in a signal of the receiving station are fed from the first output of receiver 501 to the first input of controller 503. These estimates can be additionally averaged in controller 503. The SNR in a signal of the transmitting station is estimated on the transmitting station in controller 503 by means of the information about number of acknowledgements received after transmission of L data units.

To obtain the estimate of the signal-to-noise ratio in the signal of the transmitting station on the transmitting station in transmission of L data unit, a number $L_{ACK,2}$ of acknowledgements of receiving of the second fragments transmitted after error-free receiving of the first fragments is calculated, the signal-to-noise ratio in the signal of the transmitting station z is estimated using the second fragments of L transmitted data units by the formula $$z = \frac{1}{\gamma_1}\ln\left\{-\frac{1}{\beta_1}\left[\ln(2) + \ln\left(1 - \left[\frac{L_{ACK,2}}{L \cdot (1 - \alpha_{z_0,1})^{x_{ACK}}}\right]^{\frac{1}{x}}\right)\right]\right\},$$

where $\alpha_{z_0,1} = 0.5 \cdot \exp(-\beta_1 \cdot \exp(\gamma_1 \cdot z_0))$ $\beta_1 = \text{const} = 11$ and $\gamma_1 = \text{const} = \ln(10)/10$, $z_0$ is an estimate of the signal-to-noise ratio in the signal of the receiving station, x is a fragment size, and $x_{ACK}$ is an acknowledgement size.

To obtain the estimate of the signal-to-noise ratio in the signal of the transmitting station on the transmitting station in transmission of L data unit, a number $L_{ACK,1}$ of acknowledgements of receiving of the first fragments is calculated, the signal-to-noise ratio in the signal of the transmitting station z is estimated using the first fragments of L transmitted data units by the formula $$z = \frac{1}{\gamma_1}\ln\left\{-\frac{1}{\beta_1}\left[\ln(2) + \ln\left(1 - \left[\frac{L_{ACK,1}}{L \cdot (1 - \alpha_{z_0,1})^{x_{ACK}} \cdot (1 - P)}\right]^{\frac{1}{x}}\right)\right]\right\},$$

where $\alpha_{z_0,1} = 0.5 \cdot \exp(-\beta_1 \cdot \exp(\gamma_1 \cdot z_0))$, $\beta_1 = \text{const} = 11$ and $\gamma_1 = \text{const} = \ln(10)/10$, $z_0$ is an estimate of the signal-to-noise ratio in the signal of the receiving station, P is an estimate of the station collision probability, x is a fragment size, and $x_{ACK}$ is an acknowledgement size.

To obtain the estimate of the signal-to-noise ratio in the signal of the transmitting station on the transmitting station the signal-to-noise ratio in the signal of the transmitting station z is estimated using the first fragments of L transmitted data units, the signal-to-noise ratio in the signal of the transmitting station z is estimated using the second fragments of L transmitted data units, and the estimates of the signal-to-noise ratio obtained by the first and second fragments of L transmitted data units are averaged.

The estimate of signal-to-noise ratio in the signal of the transmitting station is periodically improved on the transmitting station in controller 503 using information on number of acknowledgements received after transmission of M data units transmitted by means of the same data transmission mechanism, the same transmission rate and the same fragment size. That is, following the preliminary estimate of the SNR in a signal of the transmitting station, this estimate is periodically improved. For this purpose a sequence of M data units, where M is greater than or equal to 1, transmitted by the same transmission mechanism, using the same transmission rate and the same fragment size.

The SNR in a signal of the receiving station is estimated on the transmitting station in receiver 501 by the received ACKs for those fragments of M data units which have been received without errors on the receiving station.

Estimates of the SNR in a signal of the receiving station are applied from the fist output of receiver 501 to the first input of controller 503. These estimates can be additionally averaged in controller 503.

To improve the estimate of the signal-to-noise ratio in the signal of the transmitting station on the transmitting station in transmission of M data units, a number $M_{ACK,2}$ of acknowledgements of receiving of the second fragments transmitted after error-free receiving of the first fragments, if each of M data units contains more than one fragment, transmitted using the same data transmission mechanism, the same transmission rate $V^{(opt)}$ and the same fragment size $\tilde{x}^{(opt)}$, is calculated, the signal-to-noise ratio in the signal of the transmitting station z is estimated using the second fragments of M transmitted data units by the formula $$z = \frac{1}{\gamma_V}\ln\left\{-\frac{1}{\beta_V}\left[\ln(2) + \ln\left(1 - \left[\frac{M_{ACK,2}}{M \cdot (1 - \alpha_{z_0,V})^{x_{ACK}}}\right]^{\frac{1}{x}}\right)\right]\right\},$$

where $\alpha_{z,V} = 0.5 \cdot \exp(-\beta_V \cdot \exp(\gamma_V \cdot z))$, constants $\beta_V$ and $\gamma_V$ are different for different values of the transmission rate V, $\beta_1 = \text{const} = 11$ and $\gamma_1 = \text{const} = \ln(10)/10$ for the transmission rate V=1 Mbps, $\beta_2 = \text{const} = 4.44$ and $\gamma_2 = \text{const} = 0.195$ the transmission rate V=2 Mbps, $\beta_{5.5} = \text{const} = 3.13$ and $\gamma_{5.5} = \text{const} = 0.212$ the transmission rate V=5.5 Mbps, $\beta_{11} = \text{const} = 1.29$ and $\gamma_{11} = \text{const} = 0.231$ the transmission rate V=11 Mbps, $V = V^{(opt)}$, $z_0$ is an estimate of the signal-to-noise ratio in the signal of the receiving station, $x = \tilde{x}^{(opt)}$ is a fragment size, and $x_{ACK}$ is an acknowledgement size.

To improve the estimate of the signal-to-noise ratio in the signal of the transmitting station on the transmitting station in transmission of M data units, a number $M_{ACK,1}$ of acknowledgements of receiving of the first fragments transmitted using the same data transmission mechanism, the same transmission rate and the same fragment size, is calculated, the signal-to-noise ratio in the signal of the transmitting station z is estimated using the first fragments of M transmitted data units by the formula $$z = \frac{1}{\gamma_V}\ln\left\{-\frac{1}{\beta_V}\left[\ln(2) + \ln\left(1 - \left[\frac{M_{ACK,1}}{M \cdot (1 - \alpha_{z_0,V})^{x_{ACK}} \cdot (1 - P)}\right]^{\frac{1}{x}}\right)\right]\right\},$$

where $\alpha_{z,V} = 0.5 \cdot \exp(-\beta_V \cdot \exp(\gamma_V \cdot z))$, constants $\beta_V$ and $\gamma_V$ are different for different values of the transmission rate V, $\beta_1 = \text{const} = 11$ and $\gamma_1 = \text{const} = \ln(10)/10$ for the transmission rate V=1 Mbps, $\beta_2 = \text{const} = 4.44$ and $\gamma_2 = \text{const} = 0.195$ for the transmission rate V=2 Mbps, $\beta_{5.5} = \text{const} = 3.13$ and $\gamma_{5.5}$=const=0.212 for the transmission rate V=5.5 Mbps, $\beta_{11}$=const=1.29 and $\gamma_{11}$=const=0.231 for the transmission rate V=11 Mbps, V=V$^{(opt)}$, $z_0$ is an estimate of the signal-to-noise ratio in the signal of the receiving station, P is an estimate of the station collision probability, x is a fragment size, and $x_{ACK}$ is an acknowledgment size.

To improve the estimate of the signal-to-noise ratio in the signal of the transmitting station on the transmitting station the improved estimate of the signal-to-noise ratio in the signal of the transmitting station z is obtained using the first fragments of M transmitted data units, the improved estimate of the signal-to-noise ratio in the signal of the transmitting station z is obtained using the second fragments of M transmitted data units, the improved estimates of the signal-to-noise ratio obtained by the first and second fragments of M transmitted data units are averaged.

For additional improvement of the estimate of the signal-to-noise ratio in the signal of the transmitting station on the transmitting station the improved estimate of the signal-to-noise ratio in the signal of the transmitting station is averaged with one or more previous estimates of the signal-to-noise ratio in the signal of the transmitting station.

The process of data unit transmission from the transmitting station to the receiving station is performed as follows. Data units are fed to the input of data unit storage node 505. Before data unit transmission, in controller 503 the optimal fragment size, optimal transmission rate and the respective value of network throughput is determined for the basic data transmission mechanism using the obtained signal-to-noise ratio estimate and station collision probability estimates and the average number of stations in collision. Therefore, the size of a data unit is transmitted from the first output of data unit storage node 505 to the third input of controller 503.

For the basic data transmission mechanism, the optimal fragment size, optimal transmission rate and their respective value of the network throughput are determined by determining the value $x_{z,V,N}^{(Basic-opt)}$ for each of four transmission rates V by the formula $x_{z,V,N}^{(Basic-opt)}=(b_V/2)\cdot(\sqrt{1+4/(b_V\cdot\alpha_{z,V})}-1)$, where $b_V=\tau_V/t_V$, $\tau_V=c_8\cdot s+c_9+c_{10}\cdot t_V$, $c_8$=const is a constant value equal to 20, $c_9$=const is a constant value equal to 444, and $c_{10}$=const is a constant value equal to 336, s is an estimate of average number of idle slots between two successive transmissions in the network, $t_V=1/V$, $\alpha_{z,V}=0.5\cdot\exp(-\beta_V\cdot\exp(\gamma_V\cdot z))$, and constants $\beta_V$ and $\gamma_V$ are different for different values of transmission rate V; $\beta_1$=const=11 and $\gamma_1$=const=1n(10)/10 for transmission rate V=1 Mbps, $\beta_2$=const=4.44 and $\gamma_2$=const=0.195 for transmission rate V=2 Mbps, $\beta_{5.5}$=const=3.13 and $\gamma_{5.5}$=const=0.212 for transmission rate V=5.5 Mbps, $\beta_{11}$=const=1.29 and $\gamma_{11}$=const=0.231 for transmission rate V=11 Mbps, and z is an extrapolated estimate of signal-to-noise ratio in a signal of the transmitting station; determining the value $\tilde{x}_{z,V,N}^{(Basic-opt)}$ for each of four transmission rates V by the formula $$\tilde{x}_{z,V,N}^{(Basic-opt)} = \begin{cases} x_{max}, & x_{z,V,N}^{(Basic-opt)} \geq x_{max}, \\ 8\cdot ceil\{x_{max}/(8\cdot g)\}, & else, \end{cases}$$

where $x_{max}$ is size of a data unit, g=round$\{x_{max}/x_{z,V,N}^{(Basic-opt)}\}$, round{ } is an operation of rounding to the nearest whole number, ceil{ } is a rounding up operation; determining the value of the network throughput $W_{z,V,x,N}^{(Basic)}$ for each of four transmission rates V by the formula $W_{z,V,x,N}^{(Basic)}=x\cdot(1-\alpha_{z,V})^x/((x\cdot t_V+\tau_V)\cdot(1+P/(J\cdot(1-P))))$, where $x=\tilde{x}_{z,V,N}^{(Basic-opt)}$, P is an estimate of the station collision probability, and J is an estimate of the average number of stations in collision; determining the optimal transmission rate V$^{(Basic-opt)}$ by the formula $$V^{(Basic-opt)} = \underset{V}{\operatorname{argmax}}\{W_{z,V,x,N}^{(Basic)}\};$$

determining the optimal fragment size $\tilde{x}^{(Basic-opt)}$ equal to the fragment size $\tilde{x}_{z,V,N}^{(Basic-opt)}$ at V=V$^{(Basic-opt)}$; and determining the value of the network throughput W$^{(Basic-opt)}$, corresponding to the optimal fragment size $\tilde{x}^{(Basic-opt)}$ and the optimal transmission rate V$^{(Basic-opt)}$, being equal to the value of the network throughput $W_{z,V,x,N}^{(Basic)}$ at $x=\tilde{x}^{(Basic-opt)}$ and V=V$^{(Basic-opt)}$.

For the basic data transmission mechanism, the optimal fragment size and optimal transmission rate are a set of values of fragment size and transmission rate maximizing the network throughput when applying the basic data transmission mechanism. Separate selection of a fragment size or transmission rate value cannot maximize the network throughput in applying the basic data transmission mechanism. Only a set of values of a fragment size and transmission rate can be selected such as it maximizes the network throughput in applying the basic data transmission mechanism.

In controller 503 the optimal fragment size, optimal transmission rate and their respective value of network throughput are determined for the request-to-send/clear-to-send data transmission mechanism using the extrapolated signal-to-noise ratio estimate and estimates of the station collision probability and the average number of stations in collision.

For the request-to-send/clear-to-send data transmission mechanism, the optimal fragment size, optimal transmission rate and their respective value of the network throughput are determined by determining the value $x_{z,V,N}^{(RTS-CTS-opt)}$ for each of four transmission rates V by the formula $x_{z,V,N}^{(RTS-CTS-opt)}=(c_{V,N}/2)\cdot(\sqrt{1+4/(c_{V,N}\cdot\alpha_{z,V})}-1)$, where $c_{V,N}=\tau_V^{(Frame)}/t_V+(\tau_V^{(RTS-CTS)}/t_V)\cdot(1+P/(J\cdot(1-P)))$, $\tau_V^{(RTS-CTS)}=c_{11}\cdot s+c_{12}+c_{13}\cdot t_V$, $\tau_V^{(Frame)}=c_{14}+c_{15}\cdot t_V$, $c_{11}$=const is a constant value equal to 20, $c_{12}$=const is a constant value equal to 444, $c_{13}$=const is a constant value equal to 272, $c_{14}$=const is a constant value equal to 404, and $c_{15}$=const is a constant value equal to 336, s is an estimate of average number of idle slots between two successive transmissions in the network, $t_V=1/V$, $\alpha_{z,V}=0.5\cdot\exp(-\beta_V\cdot\exp(\gamma_V\cdot z))$, constants $\beta_V$ and $\gamma_V$ are different for different values of the transmission rates V, $\beta_1$=const=11 and $\gamma_1$=const=1n(10)/10 for transmission rate V=1 Mbps, $\beta_2$=const=4.44 and $\gamma_2$=const=0.195 for transmission rate V=2 Mbps, $\beta_{5.5}$=const=3.13 and $\gamma_{5.5}$=const=0.212 for transmission rate V=5.5 Mbps, $\beta_{11}$=const=1.29 and $\gamma_{11}$=const=0.231 for transmission rate V=11 Mbps, z is an extrapolated estimate of signal-to-noise ratio in a signal of the transmitting station, P is an estimate of the station collision probability, and J is an estimate of the number of stations in collision; determining the value $\tilde{x}_{z,V,N}^{(RTS-CTS-opt)}$ for each of four transmission rates V by the formula $$\tilde{x}_{z,V,N}^{(RTS-CTS-opt)} = \begin{cases} x_{max}, & x_{z,V,N}^{(RTS-CTS-opt)} \geq x_{max}, \\ 8 \cdot ceil\{x_{max}/(8 \cdot g)\}, & else, \end{cases}$$

where $x_{max}$ is size of a data unit, $g=\text{round}\{x_{max}/x_{z,V,N}^{(RTS-CTS-opt)}\}$, round{ } is an operation of rounding to the nearest whole number, and ceil{ } is a rounding up operation; determining the value of the network throughput $W_{z,V,x,N}^{(RTS-CTS)}$ for each of four transmission rates V by the formula $$W_{z,V,x,N}^{(RTS-CTS)} = \frac{x \cdot (1-\alpha_{z,V})^x}{x \cdot t_V + \tau_V^{(Frame)} + \tau_V^{(RTS-CTS)} \cdot (1+P/(J \cdot (1-P)))},$$

where $x=\tilde{x}_{z,V,N}^{(RTS-CTS-opt)}$; determining the optimal transmission rate $V^{(RTS-CTS-opt)}$ by the formula $$V^{(RTS-CTS-opt)} = \underset{V}{\operatorname{argmax}}\{W_{z,V,x,N}^{(RTS-CTS)}\};$$

determining the optimal fragment size $\tilde{x}^{(RTS-CTS-opt)}$, being equal to the fragment size $\tilde{x}_{z,V,N}^{(RTS-CTS-opt)}$ at $V=V^{(RTS-CTS-opt)}$; and determining the value of the network throughput $W^{(RTS-CTS-opt)}$, corresponding to the optimal fragment size $\tilde{x}^{(RTS-CTS-opt)}$ and the optimal transmission rate $V^{(RTS-CTS-opt)}$ being equal to the value of the network throughput $W_{z,V,x,N}^{(RTS-CTS)}$ at $x=\tilde{x}^{(RTS-CTS-opt)}$ and $V=V^{(RTS-CTS-opt)}$.

For the request-to-send/clear-to-send data transmission mechanism, the optimal fragment size and optimal transmission rate are a set of values of fragment size and transmission rate maximizing the network throughput when applying the request-to-send/clear-to-send data transmission mechanism. Separate selection of a fragment size or transmission rate value cannot maximize the network throughput in applying the RTS/CTS mechanism. Only a set of values of a fragment size and transmission rate can be selected such as it maximizes the network throughput in applying the RTS/CTS mechanism.

In controller 503 the basic data transmission mechanism with the respective optimal fragment size and optimal transmission rate is selected for data unit transmission, if the value of the network throughput for the basic data transmission mechanism is greater than the value of the network throughput for the request-to-send/clear-to-send data transmission mechanism.

In controller 503 the request-to-send/clear-to-send data transmission mechanism with the respective optimal fragment size and optimal transmission rate is selected for the data unit transmission, if the value of the network throughput for the request-to-send/clear-to-send transmission mechanism is greater than the value of the network throughput for the basic data transmission mechanism.

The selected data transmission mechanism and its respective optimal fragment size are used for transmission of all fragments of a data unit. Information about the selected data transmission mechanism is applied from the first output of controller 503 to the first input of transmitter 511, and information about the selected optimal fragment size is applied from the second output of controller 503 to the first input of fragmentation unit 507.

The next data unit is applied from the second output of data unit storage node 505 to the second input of fragmentation unit 507, and it is then excluded from data unit storage node 505. In fragmentation unit 507 the fragmentation of the next data unit is performed using the information about the selected optimal fragment size. A set of fragments of a data unit is applied from the output of fragmentation unit 507 to the first input of data unit fragment storage node 509.

When transmitting fragments of the data unit, the selected optimal transmission rate is used till a new estimate of the average number of idle slots between two successive transmissions in the network or a new signal-to-noise ratio estimate in the signal of the transmitting station is obtained; and a new optimal transmission rate used in transmission of fragments of a data unit is then selected.

The next fragment of a data unit is applied from the output of data unit fragment storage node 509 to the second input of transmitter 511. The selected optimal transmission rate applied from the third output of controller 503 to the third input of transmitter 511 is used in the first transmission of the first fragment of a data unit. In the first transmission of the first fragment of a data unit the selected optimal transmission rate applying from the third output of controller 503 to the third input of transmitter 511 is used. In transmitter 511 an MPDU is formed from the applied fragment of a data unit, a PLCP preamble and PLCP header are prepended to the MPDU, and the MPDU is transmitted from the output of transmitter 511 to the receiving station.

If the MPDU is received on the receiving station without errors, an acknowledgement (ACK) is transmitted from the receiving station to the transmitting station. If the ACK is received on the transmitting station without errors, it is applied to the input of receiver 501, and is fed from the third output of receiver 501 to the fourth input of controller 503, from the fourth output of which it is applied to the second input of data unit fragment storage node 509. Upon having received the fragment ACK, this fragment is excluded from data unit fragment storage node 509.

If the MPDU is received on the receiving station with errors or the ACK is received on the transmitting station with errors, the fragment is not excluded from data unit fragment storage node 509 and retransmitted.

In retransmission of the first fragment of a data unit or in transmission of other fragments of a data unit, there occurs a situation when a new estimate of the average number of idle slots between two successive transmissions in the network or a new estimate of the SNR in a signal of the transmitting station is obtained prior to transmission. In this situation a new optimal transmission rate applying from the third output of controller 503 to the third input of transmitter 511 is selected in controller 503. The new optimal transmission rate, pre-selected data transmission mechanism and pre-selected optimal fragment size are used in re-transmission of the first fragment of a data unit or in transmission of other fragments of a data unit.

Before the next transmission of a data unit fragment, the obtained estimates of the SNR are extrapolated in controller 503 at the moment of the beginning of the next transmission of a data unit fragment, thus obtaining a new extrapolated estimate of the SNR that arrives from the third output of controller 503 to the third input of transmitter 511. A new extrapolated estimate of the signal-to-noise ratio is obtained by the formula $z(t_2)=z(t_1)$, where $z(t_2)$ is the new extrapolated estimate of the signal-to-noise ratio extrapolated at time $t_2$, $z(t_1)$ is an estimate of the signal-to-noise ratio obtained at time $t_1$, and $t_2$ is a time moment that coincides with the beginning of a data unit if only one estimate of the signal-to-noise ratio is obtained before beginning of the transmission of a data unit.

A new extrapolated estimate of the signal-to-noise ratio is obtained by the formula $z(t_{L+1}) = m_z + \exp\{-\lambda(t_{L+1}-t_L)\} \cdot [z(t_L)-m_z]$, where $z(t_{L+1})$ is the new extrapolated estimate of the signal-to-noise ratio extrapolated at time $t_{L+1}$, $z(t_L)$ is an estimate of the signal-to-noise ratio obtained at time $t_L$, $t_{L+1}$ is a time moment that coincide with the beginning of a data unit, $t_L$ is a time moment when the latest estimate of the signal-to-noise ratio is obtained, $L = \min\{I, J\}$, $I \geq 2$ is number of estimates of the signal-to-noise ratio obtained before time $t_{L+1}$, $J \geq 2$ is an interpolation interval, i.e. the maximal number of estimates applied in interpolation, $$m_z = \frac{1}{L}\sum_{l=1}^{L} z(t_l),$$

$z(t_l)$ is an estimate of the signal-to-noise ratio obtained at the time moment $t_l$, $$\lambda = \operatorname*{argmin}_{\lambda}\left[\sum_{l=2}^{L}\left(\frac{(z(t_l)-m_z)(z(t_{l-1})-m_z)}{\sigma_z^2} - \exp\{-\lambda(t_l - t_{l-1})\}\right)^2\right],$$

and $$\sigma_z^2 = \frac{1}{L}\sum_{l=1}^{L}[z(t_l)-m_z]^2,$$

if more than one estimate of the signal-to-noise ratio is obtained before the beginning of the transmission of a data unit.

For the next transmission of a fragment of a data unit, a new optimal transmission rate is selected in controller 503 using the current estimates of average number of idle slots between two successive transmissions in the network, station collision probability and the average number of stations in collision, and the new extrapolated estimate of the signal-to-noise ratio.

A new optimal transmission rate for the basic data transmission mechanism is determined by the formula $$V^{(Basic-opt)} = \operatorname*{argmax}_{V}\{W_{z,V,x,N}^{(Basic)}\},$$

where $W_{z,V,x,N}^{(Basic)} = x \cdot (1-\alpha_{z,V})^x/((x \cdot t_V + \tau_V) \cdot (1+P/(J \cdot (1-P))))$, the fragment size x equals to the previously obtained optimal fragment size for the basic data transmission mechanism $\tilde{x}_{z,V,N}^{(Basic-opt)}$, $t_V = 1/V$, $\alpha_{z,V} = 0.5 \cdot \exp(-\beta_V \cdot \exp(\gamma_V \cdot z))$, the constants $\beta_V$ and $\gamma_V$ are different for different values of the transmission rates V, $\beta_1 = \text{const} = 11$ and $\gamma_1 = \text{const} = \ln(10)/10$ for the transmission rate V=1 Mbps, $\beta_2 = \text{const} = 4.44$ and $\gamma_2 = \text{const} = 0.195$ for the transmission rate V=2 Mbps, $\beta_{5.5} = \text{const} = 3.13$ and $\gamma_{5.5} = \text{const} = 0.212$ for the transmission rate V=5.5 Mbps, $\beta_{11} = \text{const} = 1.29$ and $\gamma_{11} = \text{const} = 0.231$ for the transmission rate V=11 Mbps, $\tau_V = c_8 \cdot s + c_9 + c_{10} \cdot t_V$, $c_8 = \text{const}$ is a constant value equal to 20, $c_9 = \text{const}$ is a constant value equal to 444, and $c_{10} = \text{const}$ is a constant value equal to 336, s is the latest estimate of the average number of idle slots between two successive transmissions in the network, z is a new extrapolated estimate of signal-to-noise ratio, P is the latest estimate of the station collision probability, and J is the latest estimate of the average number of stations in collision.

A new optimal transmission rate for the request-to-send/clear-to-send data transmission mechanism is determined by the formula $$V^{(RTS-CTS-opt)} = \operatorname*{argmax}_{V}\{W_{z,V,x,N}^{(RTS-CTS)}\},$$

where $$W_{z,V,x,N}^{(RTS-CTS)} = \frac{x \cdot (1-a_{z,V})^x}{x \cdot t_V + \tau_V^{(Frame)} + \tau_V^{(RTS-CTS)} \cdot (1+P/(J \cdot (1-P)))},$$

the fragment size x equals to the previous optimal fragment size for the request-to-send/clear-to-send data transmission mechanism $\tilde{x}_{z,V,N}^{(RTS-CTS-opt)}$, $t_V = 1/V$, $\alpha_{z,V} = 0.5 \cdot \exp(-\beta_V \cdot \exp(\gamma_V \cdot z))$, the constants $\beta_V$ and $\gamma_V$ are different for different values of the transmission rates V, $\beta_1 = \text{const} = 11$ and $\gamma_1 = \text{const} = \ln(10)/10$ for the transmission rate V=1 Mbps, $\beta_2 = \text{const} = 4.44$ and $\gamma_2 = \text{const} = 0.195$ for the transmission rate V=2 Mbps, $\beta_{5.5} = \text{const} = 3.13$ and $\gamma_{5.5} = \text{const} = 0.212$ for the transmission rate V=5.5 Mbps, $\beta_{11} = \text{const} = 1.29$ and $\gamma_{11} = \text{const} = 0.231$ for the transmission rate V=11 Mbps, $\tau_V^{(RTS-CTS)} = c_{11} \cdot s + c_{12} + c_{13} \cdot t_V$, $\tau_V^{(Frame)} = c_{14} + c_{15} \cdot t_V$, $c_{11} = \text{const}$ is a constant value equal to 20, $c_{12} = \text{Const}$ is a constant value equal to 444, $c_{13} = \text{const}$ is a constant value equal to 272, $c_{14} = \text{const}$ is a constant value equal to 404, and $c_{15} = \text{const}$ is a constant value equal to 336, s is the latest estimate of the average number of idle slots between two successive transmissions in the network, z is a new extrapolated estimate of signal-to-noise ratio, P is the latest estimate of the station collision probability, and J is the latest estimate of the average number of stations in collision.

The data transmission method present invention in IEEE 802.11b wireless local area network maximizes the throughput of IEEE 802.11b wireless local area network. This advantage is achieved by the selection of a transmission rate, transmission mechanism and a fragment size which maximize the network throughput considering receiving conditions on the receiving station (bit error rate in the transmitted data units of the transmitting station) and taking into account the current network loading for transmission of data units.

While the invention has been shown and described with reference to a certain embodiment thereof, it will be understood by those skilled in the art that various changes in form and details may be made therein without departing from the spirit and scope of the invention as defined by the appended claims.

What is claimed is:

1. A data transmission method for a wireless network that includes at least one transmitter and one receiver, comprising the steps of:
  by the receiver, periodically estimating a signal-to-noise ratio in a signal of the transmitter and the estimate is transmitting the estimate from the receiver to the transmitter;
  by the transmitter, periodically estimating an average number of idle slots between two successive transmissions in the network;

estimating a number of active stations, consisting of transmitters and receivers, in the network using the estimate of the average number of idle slots between two successive transmissions in the network;

estimating station collision probability and an average number of stations in collision using the estimate of number of active stations in the network, before data unit transmission;

extrapolating the obtained estimates of the signal-to-noise ratio, thus obtaining the extrapolated estimate of the signal-to-noise ratio;

determining the optimal fragment size, optimal transmission rate and the respective value of network throughput for the basic data transmission mechanism using the extrapolated signal-to-noise ratio estimate and estimates of station collision probability and the average number of stations in collision;

determining the optimal fragment size, optimal transmission rate and their respective value of network throughput for the request-to-send/clear-to-send data transmission mechanism using the extrapolated signal-to-noise ratio estimate and estimates of station collision probability and the average number of stations in collision;

selecting the basic data transmission mechanism with the respective optimal fragment size and optimal transmission rate for data unit transmission, if the value of the network throughput for the basic data transmission mechanism is greater than the value of the network throughput for the request-to-send/clear-to-send data transmission mechanism;

selecting the request-to-send/clear-to-send data transmission mechanism with the respective optimal fragment size and optimal transmission rate for the data unit transmission, if the value of the network throughput for the request-to-send/clear-to-send data transmission mechanism is greater than the value of the network throughput for the basic data transmission mechanism, the selected data transmission mechanism and its respective optimal fragment size are used for transmission of all fragments of a data unit, the selected optimal transmission rate is used at the first transmission of the first fragment of the data unit, before the next transmission of a fragment of the data unit;

extrapolating the estimates of the signal-to-noise ratio obtained up to the moment of the beginning of the next transmission of a fragment of the data unit, thus obtaining a new extrapolated estimate of the signal-to-noise ratio, for the next transmission of a fragment of the data unit; and selecting a new optimal transmission rate using the current estimates of average number of idle slots between two successive transmissions in the network, station collision probability and the average number of stations in collision, and the new extrapolated estimate of the signal-to-noise ratio.

2. The method of claim 1, further comprising the step of: by the transmitter, estimating the average number of idle slots between two successive transmissions in the network, K successive measurements of number of idle slots between two successive transmissions in the network are performed, where K is greater than or equal to 1, K successive measurements of number of idle slots between two successive transmissions in the network are averaged, thus obtaining a first estimate of average number of idle slots between two successive transmissions in the network, and each successive estimate of average number of idle slots between two successive transmissions in the network is obtained by averaging each new measurement with (K−1) preceding measurements.

3. The method of claim 1, wherein if a number of stations $N_0$ registered in the network is known at the transmitter, a number of active stations in the network N is estimated by $N=\min\{N_0, (c_1/s+c_2)^{c_3}\}$, where s is the estimate of average number of idle slots between two successive transmissions in the network, $c_1$=const is a constant value equal to 1.55, $c_2$=const is a constant value equal to 0.9, and $c_3$=const is a constant value equal to 6.949.

4. The method of claim 1, wherein if a number of stations registered in the network is unknown at the transmitter, a number of active stations in the network N is estimated by $N=(c_1/s+c_2)^{c_3}$, where s is an estimate of average number of idle slots between two successive transmissions in the network, $c_1$=const is a constant value equal to 1.55, $c_2$=Const is a constant value equal to 0.9, and $c_3$=const is a constant value equal to 6.949.

5. The method of claim 1, further comprising the step of estimating the station collision probability P by $P=c_4 \cdot [\ln(N)]^{c_5}$, where N is an estimate of number of active stations in the network, $c_4$=const is a constant value equal to 0.114, and $c_5$=const is a constant value equal to 1.11.

6. The method of claim 1, further comprising the step of estimating an average number of stations in collision J by $J=2+c_6 \cdot [\ln(N-1)]^{c_7}$, where N is an estimate of number of active stations in the network, $c_6$=const is a constant value equal to 0.0263, and $c_7$=const is a constant value equal to 1.744.

7. The method of claim 1, further comprising the step of extrapolating an estimate of the signal-to-noise ratio by $z(t_2)=z(t_1)$, where $z(t_2)$ is an estimate of the signal-to-noise ratio extrapolated at time $t_2$, $z(t_1)$ is an estimate of the signal-to-noise ratio obtained at time $t_1$, and $t_2$ is a time moment that coincides with the beginning of the data unit if only one estimate of the signal-to-noise ratio is obtained before beginning of the transmission of the data unit.

8. The method of claim 1, further comprising the step of extrapolating an estimate of the signal-to-noise ratio by $z(t_{L+1})=m_z+\exp\{-\lambda(t_{L+1}-t_L)\} \cdot [z(t_L)-m_z]$, where $z(t_{L+1})$ is an estimate of the signal-to-noise ratio extrapolated at time $t_{L+1}$, $z(t_L)$ is an estimate of the signal-to-noise ratio obtained at time $t_L$, and $t_{L+1}$ is a time moment that coincides with the beginning of the data unit, $t_L$ is a time moment when the latest estimate of the signal-to-noise ratio is obtained, $L=\min\{I,J\}$, $I \geq 2$ is number of estimates of the signal-to-noise ratio obtained before time $t_{L+1}$, $J \geq 2$ is an interpolation interval, i.e. the maximal number of estimates applied in interpolation, $$m_z = \frac{1}{L}\sum_{l=1}^{L} z(t_l),$$

$z(t_l)$ is an estimate of the signal-to-noise ratio obtained at time $t_l$, $$\lambda = \arg\min_\lambda \left[\sum_{l=2}^{L}\left(\frac{(z(t_l)-m_z)(z(t_{l-1})-m_z)}{\sigma_z^2} - \exp\{-\lambda(t_l-t_{l-1})\}\right)^2\right],$$

$$\text{and } \sigma_z^2 = \frac{1}{L}\sum_{l=1}^{L}[z(t_l)-m_z]^2,$$

if more than one estimate of the signal-to-noise ratio is obtained before the beginning of the transmission of the data unit.

9. The method of claim 1, wherein for the basic data transmission mechanism, the optimal fragment size and optimal transmission rate are a set of values of fragment size and transmission rate that maximize the network throughput when applying the basic data transmission mechanism.

10. The method of claim 1, wherein for the request-to-send/clear-to-send data transmission mechanism, the optimal fragment size and optimal transmission rate are a set of values of fragment size and transmission rate that maximize the network throughput when applying the request-to-send/clear-to-send data transmission mechanism.

11. The method of claim 1, wherein for the basic data transmission mechanism, the optimal fragment size, optimal transmission rate and their respective value of the network throughput are determined by:

determining the value $x_{z,V,N}^{(Basic-opt)}$ for each of four transmission rates V by $x_{z,V,N}^{(Basic-opt)} = (b_V/2) \cdot (\sqrt{1+4/(b_V \cdot \alpha_{z,V})}-1)$, where $b_V = \tau_V/t_V$, $\tau_V = c_8 \cdot s + c_9 + c_{10} \cdot t_V$, $c_8$=const is a constant value equal to 20, $c_9$=const is a constant value equal to 444, and $c_{10}$=const is a constant value equal to 336, s is an estimate of an average number of idle slots between two successive transmissions in the network, $t_V = 1/V$, $\alpha_{z,V} = 0.5 \cdot \exp(-\beta_V \cdot \exp(\gamma_V \cdot z))$, and constants $\beta_V$ and $\gamma_V$ are different for different values of transmission rate V; $\beta_1$=const=11 and $\gamma_1$=const=ln(10)/10 for transmission rate V=1 Mbps, $\beta_2$=const=4.44 and $\gamma_2$=const=0.195 for transmission rate V=2 Mbps, $\beta_{5.5}$=const=3.13 and $\gamma_{5.5}$=const=0.212 for transmission rate V=5.5 Mbps, $\beta_{11}$=const=1.29 and $\gamma_{11}$=const=0.231 for transmission rate V=11 Mbps, and z is an extrapolated estimate of signal-to-noise ratio in a signal of the transmitter;

determining the value $\tilde{x}_{z,V,N}^{(Basic-opt)}$ for each of four transmission rates V by the formula $$\tilde{x}_{z,V,N}^{(Basic-opt)} = \begin{cases} x_{max}, & x_{z,V,N}^{(Basic-opt)} \geq x_{max}, \\ 8 \cdot ceil\{x_{max}/(8 \cdot g)\}, & else, \end{cases}$$

where $x_{max}$ is size of the data unit, g=round$\{x_{max}/x_{z,V,N}^{(Basic-opt)}\}$, round$\{\ \}$ is an operation of rounding to the nearest whole number, and ceil$\{\ \}$ is a rounding up operation;

determining the value of the network throughput $W_{z,V,x,N}^{(Basic)}$ for each of four transmission rates V by the formula $W_{z,V,x,N}^{(Basic)} = x \cdot (1-\alpha_{z,V})^x / ((x \cdot t_V + \tau_V) \cdot (1 + P/(J \cdot (1-P))))$, where $x = \tilde{x}_{z,V,N}^{(Basic-opt)}$, P is an estimate of the station collision probability, and J is an estimate of the average number of stations in collision;

determining the optimal transmission rate $V^{(Basic-opt)}$ by the formula $$V^{(Basic-opt)} = \operatorname{argmax}_V \{W_{z,V,x,N}^{(Basic)}\};$$

determining the optimal fragment size $\tilde{x}^{(Basic-opt)}$ equal to the fragment size $\tilde{x}_{z,V,N}^{(Basic-opt)}$ at $V = V^{(Basic-opt)}$; and determining the value of the network throughput $W^{(Basic-opt)}$, corresponding to the optimal fragment size $\tilde{x}^{(Basic-opt)}$ and the optimal transmission rate $V^{(Basic-opt)}$, being equal to the value of the network throughput $W_{z,V,x,N}^{(Basic)}$ at $x = \tilde{x}^{(Basic-opt)}$ and $V = V^{(Basic-opt)}$.

12. The method of claim 1, wherein for the request-to-send/clear-to-send data transmission mechanism, the optimal fragment size, optimal transmission rate and their respective value of the network throughput are determined by:

determining the value $x_{z,V,N}^{(RTS-CTS-opt)}$ for each of four transmission rates V by $x_{z,V,N}^{(RTS-CTS-opt)} = (c_{V,N}/2) \cdot (\sqrt{1+4/(c_{V,N} \cdot \alpha_{z,V})}-1)$, where $c_{V,N} = \tau_V^{(Frame)}/t_V + (\tau_V^{(RTS-CTS)}/t_V) \cdot (1 + P/(J \cdot (1-P)))$, $\tau_V^{(RTS-CTS)} = c_{11} \cdot s + c_{12} + c_{13} \cdot t_V$, $\tau_V^{(Frame)} = c_{14} + c_{15} \cdot t_V$, $c_{11}$=const is a constant value equal to 20, $c_{12}$=const is a constant value equal to 444, $C_{13}$=const is a constant value equal to 272, $c_{14}$=const is a constant value equal to 404, $c_{15}$=const is a constant value equal to 336, s is an estimate of the average number of idle slots between two successive transmissions in the network, $t_V = 1/V$, $\alpha_{z,V} = 0.5 \cdot \exp(-\beta_V \cdot \exp(\gamma_V \cdot z))$, constants $\beta_V$ and $\gamma_V$ are different for different values of the transmission rates V, $\beta_1$=const=11 and $\gamma_1$=const=ln(10)/10 for transmission rate V=1 Mbps, $\beta_2$=const=4.44 and $\gamma_2$=const=0.195 for transmission rate V=2 Mbps, $\beta_{5.5}$=const=3.13 and $\gamma_{5.5}$=const=0.212 for transmission rate V=5.5 Mbps, $\beta_{11}$=const=1.29 and $\gamma_{11}$=const=0.231 for transmission rate V=11 Mbps, z is an extrapolated estimate of signal-to-noise ratio in a signal of the transmitter, P is an estimate of the station collision probability, and J is an estimate of the average number of stations in collision;

determining the value $\tilde{x}_{z,V,N}^{(RTS-CTS-opt)}$ for each of four transmission rates V by $$\tilde{x}_{z,V,N}^{(RTS-CTS-opt)} = \begin{cases} x_{max}, & x_{z,V,N}^{(RTS-CTS-opt)} \geq x_{max}, \\ 8 \cdot ceil\{x_{max}/(8 \cdot g)\}, & else, \end{cases}$$

is size of the data unit, g=round$\{x_{max}/x_{z,V,N}^{(RTS-CTS-opt)}\}$, round$\{\ \}$ is an operation of rounding to the nearest whole number, and ceil$\{\ \}$ is a rounding up operation;

determining the value of the network throughput $W_{z,V,x,N}^{(RTS-CTS)}$ for each of four transmission rates V by $$W_{z,V,x,N}^{(RTS-CTS)} = \frac{x \cdot (1-\alpha_{z,V})^x}{x \cdot t_V + \tau_V^{(Frame)} + \tau_V^{(RTS-CTS)} \cdot (1 + P/(J \cdot (1-P)))},$$

where $x = \tilde{x}_{z,V,N}^{(RTS-CTS-opt)}$;

determining the optimal transmission rate $V^{(RTS-CTS-opt)}$ by the formula $$V^{(RTS-CTS-opt)} = \operatorname{argmax}_V \{W_{z,V,x,N}^{(RTS-CTS)}\};$$

determining the optimal fragment size $\tilde{x}^{(RTS-CTS-opt)}$, being equal to the fragment size $\tilde{x}_{z,V,N}^{(RTS-CTS-opt)}$ at $V = V^{(RTS-CTS-opt)}$; and determining the value of the network throughput $W_{z,V,x,N}^{(RTS-CTS-opt)}$, corresponding to the optimal fragment size $\tilde{x}_{z,V,N}^{(RTS-CTS-opt)}$ and the optimal transmission rate $V^{(RTS-CTS-opt)}$, being equal to the value of the network throughput $W_{z,V,x,N}^{(RTS-CTS)}$ at $x = \tilde{x}^{(RTS-CTS-opt)}$ and $V = V^{(RTS-CTS-opt)}$.

13. The method of claim 1, wherein a new extrapolated estimate of the signal-to-noise ratio is obtained by $z(t_2) = z(t_1)$, where $z(t_2)$ is a new extrapolated estimate of the signal-tonoise ratio, extrapolated at time $t_2$, $z(t_1)$ is an estimate of the signal-to-noise ratio obtained at time $t_1$, and $t_2$ is a time moment that coincides with the beginning of the next transmission of a fragment of a data unit, if only one estimate of the signal-to-noise ratio is obtained before the beginning of the next transmission of a fragment of the data unit.

14. The method of claim 1, wherein a new extrapolated estimate of the signal-to-noise ratio is obtained by $z(t_{L+1})=m_z+\exp\{-\lambda(t_{L+1}-t_L)\}[z(t_L)-m_z]$, where $z(t_{L+1})$ is a new extrapolated estimate of the signal-to-noise ratio extrapolated at time $t_{L+1}$, $z(t_L)$ is an estimate of the signal-to-noise ratio obtained at time $t_L$, $t_{L+1}$ is a time moment that coincides with the beginning of the next transmission of a fragment of the data unit, $t_L$ is a time moment when the latest estimate of the signal-to-noise ratio is obtained, $L=\min\{I,J\}$, $I \geq 2$ is number of estimates of the signal-to-noise ratio obtained before time $t_{L+1}$, $J \geq 2$ is an interpolation interval, i.e. the maximal number of estimates applied in interpolation, $$m_z = \frac{1}{L}\sum_{l=1}^{L} z(t_l),$$

$z(t_l)$ is an estimate of the signal-to-noise ratio obtained at time $t_l$, $$\lambda = \operatorname*{argmin}_{\lambda}\left[\sum_{l=2}^{L}\left(\frac{(z(t_l)-m_z)(z(t_{l-1})-m_z)}{\sigma_z^2} - \exp\{-\lambda(t_l-t_{l-1})\}\right)^2\right],$$

and $$\sigma_z^2 = \frac{1}{L}\sum_{l=1}^{L}[z(t_l)-m_z]^2,$$

if more than one estimate of the signal-to-noise ratio is obtained before the beginning of the next transmission of a fragment of the data unit.

15. The method of claim 1, wherein a new optimal transmission rate for the basic data transmission mechanism is determined by $$V^{(Basic-opt)} = \operatorname*{argmax}_{V}\{W_{z,V,x,N}^{(Basic)}\},$$

where $W_{z,V,x,N}^{(Basic)}=x \cdot (1-\alpha_{z,V})^x/((x \cdot t_V+\tau_V) \cdot (1+P/(J \cdot (1-P))))$, the fragment size x equals to the previously obtained optimal fragment size for the basic data transmission mechanism $\tilde{x}_{z,V,N}^{(Basic-opt)}$, $t_V=1/V$, $\alpha_{z,V}=0.5 \cdot \exp(-\beta_V \cdot \exp(\gamma_V \cdot z))$, the constants $\beta_V$ and $\gamma_V$ are different for different values of the transmission rates V, $\beta_1$=const=11 and $\gamma_1$=const=ln(10)/10 for the transmission rate V=1 Mbps, $\beta_2$=const=4.44 and $\gamma_2$=const=0.195 for the transmission rate V=2 Mbps, $\beta_{5.5}$=const=3.13 and $\gamma_{5.5}$=const=0.212 for the transmission rate V=5.5 Mbps, $\beta_{11}$=const=1.29 and $\gamma_{11}$=const=0.231 for the transmission rate V=11 Mbps, $\tau_V=c_8 \cdot s+c_9+c_{10} \cdot t_V$, $c_8$=const is a constant value equal to 20, $c_9$=const is a constant value equal to 444, $c_{10}$=const is a constant value equal to 336, s is the latest estimate of the average number of idle slots between two successive transmissions in the network, z is the new extrapolated estimate of signal-to-noise ratio, P is the latest estimate of the station collision probability, and J is the latest estimate of the average number of stations in collision.

16. The method of claim 1, wherein a new optimal transmission rate for the request-to-send/clear-to-send data transmission mechanism is determined by $$V^{(RTS-CTS-opt)} = \operatorname*{argmax}_{V}\{W_{z,V,x,N}^{(RTS-CTS)}\},$$

where $$W_{z,V,x,N}^{(RTS-CTS-opt)} = \frac{x \cdot (1-\alpha_{z,V})^x}{x \cdot t_V + \tau_V^{(Frame)} + \tau_V^{(RTS-CTS)} \cdot (1+P/(J \cdot (1-P)))},$$

the fragment size x equals to the previous optimal fragment size for the request-to-send/clear-to-send data transmission mechanism $\tilde{x}_{z,V,x,N}^{(RTS-CTS-opt)}$, $t_V=1/V$, $\alpha_{z,V}=0.5 \cdot \exp(-\beta_V \cdot \exp(\gamma_V \cdot z))$, the constants $\beta_V$ and $\gamma_V$ are different for different values of the transmission rates V, $\beta_1$=const=11 and $\gamma_1$=const=ln(10)/10 for the transmission rate V=1 Mbps, $\beta_2$=const=4.44 and $\gamma_2$=const=0.195 for the transmission rate V=2 Mbps, $\beta_{5.5}$=const=3.13 and $\gamma_{5.5}$=const=0.212 for the transmission rate V=5.5 Mbps, $\beta_{11}$=const=1.29 and $\gamma_{11}$=const=0.231 for the transmission rate V=11 Mbps, $\tau_V^{(RTS-CTS)}=c_{11} \cdot s+c_{12}+c_{13} \cdot t_V$, $\tau_V^{(Frame)}=c_{14}+c_{15} \cdot t_V$, $c_{11}$=const is a constant value equal to 20, $c_{12}$=const is a constant value equal to 444, $c_{13}$=const is a constant value equal to 272, $c_{14}$=const is a constant value equal to 404, $c_{15}$=const is a constant value equal to 336, s is the latest estimate of the average number of idle slots between two successive transmissions in the network, z is the new extrapolated estimate of signal-to-noise ratio, P is the latest estimate of the station collision probability, and J is the latest estimate of the average number of stations in collision.

17. The method of claim 1, wherein L data units, where L is greater than or equal to 1, are transmitted from the transmitter to the receiver using the basic data transmission mechanism, the most reliable transmission rate and a fragment size being equal for all L data units so that one data unit contains two or more fragments and two first fragments of each data unit have the same size, acknowledgements for those fragments L of data units that has been received without errors at the receiver are received at the transmitter the signal-to-noise ratio in a signal of the receiver is estimated by the received acknowledgements on the transmitter, the signal-to-noise ratio in a signal of the transmitter is estimated on the transmitter using information about number of acknowledgments received after transmission of L data units, if the value of the network throughput for the request-to-send/clear-to-send data transmission mechanism is greater than the value of the network throughput for the basic data transmission mechanism, the selected data transmission mechanism and its respective optimal fragment size are used for transmission of all fragments of a data unit, when transmitting fragments of the data unit, the selected optimal transmission rate is used till a new estimate of average number of idle slots between two successive transmissions in the network or a new signal-to-noise ratio estimate in the signal of the transmitter is obtained; and a new optimal transmission rate used in transmission of fragments of a data unit is then selected, the estimate of signal-to-noise ratio in the signal of the transmitter is periodically improved on the transmitter using information on number of acknowledgements received after transmission of M data units transmitted by means of the same data transmission mechanism, the same transmission rate and the same fragment size.

18. The method claim 17, wherein to obtain the estimate of the signal-to-noise ratio in the signal of the transmitter at the transmitter, during the transmission of L data unit, a number $L_{ACK,2}$ of acknowledgements of receiving the second fragments transmitted after error-free receiving of the first fragments is calculated, the signal-to-noise ratio in the signal of the transmitter z is estimated using the second fragments of L transmitted data units by $$z = \frac{1}{\gamma_1}\ln\left\{-\frac{1}{\beta_1}\left[\ln(2) + \ln\left(1 - \left[\frac{L_{ACK,2}}{L\cdot(1-\alpha_{z_0,1})^{x_{ACK}}}\right]^{\frac{1}{x}}\right)\right]\right\},$$

where $\alpha_{z_0,1} = 0.5\cdot\exp(-\beta_1\cdot\exp(\gamma_1\cdot z_0))$, $\beta_1 = \text{const} = 11$ and $\gamma_1 = \text{const} = \ln(10)/10$, $z_0$ is an estimate of the signal-to-noise ratio in the signal of the receiver, x is a fragment size, and $x_{ACK}$ is an acknowledgement size.

19. The method of claim 17, wherein to obtain the estimate of the signal-to-noise ratio in the signal of the transmitter at the transmitter, during the transmission of L data unit, a number $L_{ACK,1}$ of acknowledgements of receiving the first fragments is calculated, the signal-to-noise ratio in the signal of the transmitter z is estimated using the first fragments of L transmitted data units by $$z = \frac{1}{\gamma_1}\ln\left\{-\frac{1}{\beta_1}\left[\ln(2) + \ln\left(1 - \left[\frac{L_{ACK,1}}{L\cdot(1-\alpha_{z_0,1})^{x_{ACK}}\cdot(1-P)}\right]^{\frac{1}{x}}\right)\right]\right\},$$

where $\alpha_{z_0,1} = 0.5\cdot\exp(-\beta_1\cdot\exp(\gamma_1\cdot z_0))$, $\beta_1 = \text{const} = 11$ and $\gamma_1 = \text{const} = \ln(10)/10$, $z_0$ is an estimate of the signal-to-noise ratio in the signal of the receiver, P is an estimate of the station collision probability, x is a fragment size, and $x_{ACK}$ is an acknowledgement size.

20. The method of claim 17, wherein to obtain the estimate of the signal-to-noise ratio in the signal of the transmitter on the transmitter, the signal-to-noise ratio in the signal of the transmitter z is estimated using the first fragments of L transmitted data units, the signal-to-noise ratio in the signal of the transmitter z is estimated using the second fragments of L transmitted data units, and the estimates of the signal-to-noise ratio obtained by the first and second fragments of L transmitted data units are averaged.

21. The method of claim 17, wherein to improve the estimate of the signal-to-noise ratio in the signal of the transmitter at the transmitter, during transmission of M data units, a number $M_{ACK,2}$ of acknowledgements of receiving of the second fragments transmitted after error-free receiving the first fragments, if each of M data units contains more than one fragment, transmitted using the same data transmission mechanism, the same transmission rate $V^{(opt)}$ and the same fragment size $\tilde{x}^{(opt)}$, is calculated, the signal-to-noise ratio in the signal of the transmitter z is estimated using the second fragments of M transmitted data units by $$z = \frac{1}{\gamma_V}\ln\left\{-\frac{1}{\beta_V}\left[\ln(2) + \ln\left(1 - \left[\frac{M_{ACK,2}}{M\cdot(1-\alpha_{z_0,V})^{x_{ACK}}}\right]^{\frac{1}{x}}\right)\right]\right\},$$

where $\alpha_{z,V} = 0.5\cdot\exp(-\beta_V\cdot\exp(\gamma_V\cdot z))$, constants $\beta_V$ and $\gamma_V$ are different for different values of the transmission rate V, $\beta_1 = \text{const} = 11$ and $\gamma_1 = \text{const} = \ln(10)/10$ for the transmission rate V=1 Mbps, $\beta_2 = \text{const} = 4.44$ and $\gamma_2 = \text{const} = 0.195$ the transmission rate V=2 Mbps, $\beta_{5.5} = \text{const} = 3.13$ and $\gamma_{5.5} = \text{const} = 0.212$ the transmission rate V=5.5 Mbps, $\beta_{11} = \text{const} = 1.29$ and $\gamma_{11} = \text{const} = 0.231$ the transmission rate V=11 Mbps, $V=V^{(opt)}$, $z_0$ is an estimate of the signal-to-noise ratio in the signal of the receiver, $x=\tilde{x}^{(opt)}$ is a fragment size, and $x_{ACK}$ is an acknowledgement size.

22. The method of claim 17, wherein to improve the estimate of the signal-to-noise ratio in the signal of the transmitter at the transmitter, during the transmission of M data units, a number $M_{ACK,1}$ of acknowledgements of receiving of the first fragments transmitted using the same data transmission mechanism, the same transmission rate and the same fragment size, is calculated, the signal-to-noise ratio in the signal of the transmitter z is estimated using the first fragments of M transmitted data units by $$z = \frac{1}{\gamma_V}\ln\left\{-\frac{1}{\beta_V}\left[\ln(2) + \ln\left(1 - \left[\frac{M_{ACK,1}}{M\cdot(1-\alpha_{z_0,V})^{x_{ACK}}\cdot(1-P)}\right]^{\frac{1}{x}}\right)\right]\right\},$$

where $\alpha_{z,V} = 0.5\cdot\exp(-\beta_V\cdot\exp(\gamma_V\cdot z))$, constants $\beta_V$ and $\gamma_V$ are different for different values of the transmission rate V, $\beta_1 = \text{const} = 11$ and $\gamma_1 = \text{const} = \ln(10)/10$ for the transmission rate V=1 Mbps, $\beta_2 = \text{const} = 4.44$ and $\gamma_2 = \text{const} = 0.195$ for the transmission rate V=2 Mbps, $\beta_{5.5} = \text{const} = 3.13$ and $\gamma_{5.5} = \text{const} = 0.212$ for the transmission rate V=5.5 Mbps, $\beta_{11} = \text{const} = 1.29$ and $\gamma_{11} = \text{const} = 0.231$ for the transmission rate V=11 Mbps, $V=V^{(opt)}$, $z_0$ is an estimate of the signal-to-noise ratio in the signal of the receiver, P is an estimate of the station collision probability, x is a fragment size, and $x_{ACK}$ is an acknowledgment size.

23. The method of claim 17, wherein to improve the estimate of the signal-to-noise ratio in the signal of the transmitter at the transmitter, the improved estimate of the signal-to-noise ratio in the signal of the transmitter z is obtained using the first fragments of M transmitted data units, the improved estimate of the signal-to-noise ratio in the signal of the transmitter z is obtained using the second fragments of M transmitted data units, the improved estimates of the signal-to-noise ratio obtained by the first and second fragments of M transmitted data units are averaged.

24. The method of claim 17, wherein for additional improvement of the estimate of the signal-to-noise ratio in the signal of the transmitter on the transmitter, the improved estimate of the signal-to-noise ratio in the signal of the transmitter is averaged with one or more previous estimates of the signal-to-noise ratio in the signal of the transmitter.

25. The method of claim 1, wherein the signal-to-noise ratio in the signal of the transmitter z is estimated by $z=z_0\cdot(P_1/P_0)\cdot 10^{(F_0-F_1)/10}$, where $z_0$ is an estimate of the signal-to-noise ratio in the signal of the receiver, $P_1$ is transmission power of the transmitter, $P_0$ is transmission power of the receiver, $F_1$ is a noise figure of the transmitter, and $F_0$ is a noise figure of the receiver.

26. A data transmission method for a wireless network that includes at least one transmitter and one receiver, comprising the steps of:
estimating an average number of idle slots between two successive transmissions in a network by a transmitter;
estimating a number of active stations, consisting of transmitters and receivers, in a network using the estimate of average number of idle slots between two successive transmissions in a network;

estimating station collision probability and an average number of stations in a collision using the estimate of number of active stations in a network;

transmitting L1, L2, L3, L4 data units, where L1, L2, L3, L4 are greater than or equal to 1, from the transmitter to a receiver using a basic data transmission mechanism, first, second, third and fourth transmission rates V1, V2, V3, V4 and such a fragment size;

receiving by the transmitter the same for all L1, L2, L3, L4 data units so that one data unit contain two or more fragments and first two fragments of each data unit have the same size, acknowledgements for those fragments of L1, L2, L3, L4 data units received without errors at the receiver;

estimating bit error rate $\alpha_{z,V1}$, $\alpha_{z,V2}$, $\alpha_{z,V3}$, $\alpha_{z,V4}$ for the first, second, third and fourth transmission rate in the transmitted data units of the transmitter using information about a number of acknowledgements received after transmission of L1, L2, L3, L4 data units;

determining a fragment size $\tilde{x}1^{(Basic)}$, $\tilde{x}2^{(Basic)}$, $\tilde{x}3^{(Basic)}$, $\tilde{x}4^{(Basic)}$ for the first, second, third and fourth transmission rate V1, V2, V3, V4 and the basic data transmission mechanism using an estimate of the bit error rate $\alpha_{z,V1}$ $\alpha_{z,V1}$, $\alpha_{z,V2}$, $\alpha_{z,V3}$, $\alpha_{z,V4}$ for the first, second, third and fourth transmission rate V1, V2, V3, V4 and the estimate of average number of idle slots between two successive transmissions in a network;

determining a value of the network throughput $W1^{(Basic)}$, $W2^{(Basic)}$, $W3^{(Basic)}$, $W4^{(Basic)}$ for the first, second, third and fourth transmission rate V1, V2, V3, V4 and basic data transmission mechanism by means of the estimate of bit error rate $\alpha_{z,V1}$ $\alpha_{z,V1}$, $\alpha_{z,V2}$, $\alpha_{z,V3}$, $\alpha_{z,V4}$ for the first, second, third and fourth transmission rate V1, V2, V3, V4, fragment size $\tilde{x}1^{(Basic)}$, $\tilde{x}2^{(Basic)}$, $\tilde{x}3^{(Basic)}$, $\tilde{x}4^{(Basic)}$ for the first, second, third and fourth transmission rate V1, V2, V3, V4 and the basic data transmission mechanism, estimates of the average number of idle slots between two successive transmissions in the network, station collision probability and the average number of stations in a collision;

determining a fragment size $\tilde{x}1^{(RTS\text{-}CTS)}$, $\tilde{x}2^{(RTS\text{-}CTS)}$, $\tilde{x}3^{(RTS\text{-}CTS)}$, $\tilde{x}4^{(RTS\text{-}CTS)}$ for the first, second, third and fourth transmission rate V1, V2, V3, V4 and request-to-send/clear-to-send data transmission mechanism by means of the estimate of the bit error rate $\alpha_{z,V1}$, $\alpha_{z,V2}$, $\alpha_{z,V3}$, $\alpha_{z,V4}$ for the first, second, third and fourth transmission rate V1, V2, V3, V4, estimates of average number of idle slots between two successive transmissions in the network, station collision probability and the average number of stations in a collision, a value of the network throughput $W1^{(RTS\text{-}CTS)}$, $W2^{(RTS\text{-}CTS)}$, $W3^{(RTS\text{-}CTS)}$, $W4^{(RTS\text{-}CTS)}$ for the first, second, third and fourth transmission rate V1, V2, V3, V4 and request-to-send/clear-to-send data transmission mechanism is determined by means of the estimate of the bit error rate $\alpha_{z,V1}$, $\alpha_{z,V2}$, $\alpha_{z,V3}$, $\alpha_{z,V4}$ for the first, second, third and fourth transmission rate V1, V2, V3, V4, fragment size $\tilde{x}1^{(RTS\text{-}CTS)}$, $\tilde{x}2^{(RTS\text{-}CTS)}$, $\tilde{x}3^{(RTS\text{-}CTS)}$, $\tilde{x}4^{(RTS\text{-}CTS)}$ for the first, second, third and fourth transmission rate V1, V2, V3, V4 and the request-to-send/clear-to-send data transmission mechanism, estimates of the average number of idle slots between two successive transmissions in the network, station collision probability and the average number of stations in a collision;

determining a value of the network throughput $W1^{(max)}$, $W2^{(max)}$, $W3^{(max)}$, $W4^{(max)}$ for the first, second, third and fourth transmission rate V1, V2, V3, V4 as a maximal value from the value of the network throughput $W1^{(Basic)}$, $W2^{(Basic)}$, $W3^{(Basic)}$, $W4^{(Basic)}$ for the first second, third and fourth transmission rate V1, V2, V3, V4 and the basic data transmission mechanism and the value of the network throughput $W1^{(RTS\text{-}CTS)}$, $W2^{(RTS\text{-}CTS)}$, $W3^{(RTS\text{-}CTS)}$, $W4^{(RTS\text{-}CTS)}$ for the first, second, third and fourth transmission rate V1, V2, V3, V4 and the request-to-send/clear-to-send data transmission mechanism;

comparing the value of the network throughput $W1^{(max)}$ for the first transmission rate V1 and the value of the network throughput $W2^{(max)}$ for the second transmission rate V2;

if the value of the network throughput $W1^{(max)}$ for the first transmission rate V1 is greater than the value of the network throughput $W2^{(max)}$ for the second transmission rate V2, selecting the first transmission rate V1 for data transmission;

comparing the value of the network throughput $W1^{(Basic)}$ for the first transmission rate V1 and the basic transmission mechanism and the value of the network throughput $W1^{(RTS\text{-}CTS)}$ for the first transmission rate V1 and the request-to-send/clear-to-send data transmission mechanism;

if the value of the network throughput $W1^{(Basic)}$ for the first transmission rate V1 and the basic transmission mechanism is greater than or equal to the value of the network throughput $W1^{(RTS\text{-}CTS)}$ for the first transmission rate V1 and the request-to-send/clear-to-send data transmission mechanism, selecting the basic transmission mechanism and fragment size $\tilde{x}1^{(Basic)}$ for the first transmission rate V1 and basic transmission mechanism for data transmission, otherwise, selecting the request-to-send/clear-to-send data transmission mechanism and fragment size $\tilde{x}1^{(RTS\text{-}CTS)}$ for the first transmission rate V1 and request-to-send/clear-to-send data transmission mechanism for data transmission, if the value of the network throughput $W1^{(max)}$ for the first transmission rate V1 is less than the value of the network throughput $W2^{(max)}$ for the second transmission rate V2;

comparing the value of the network throughput $W2^{(max)}$ for the second transmission rate V2 and the value of the network throughput $W3^{(max)}$ for the third transmission rate V3;

if the value of the network throughput $W2^{(max)}$ for the second transmission rate V2 is more than the value of the network throughput $W3^{(max)}$ for the third transmission rate V3, selecting the second transmission rate V2 for data transmission;

comparing the value of the network throughput $W2^{(Basic)}$ for the second transmission rate V2 and the basic transmission mechanism and the value of the network throughput $W2^{(RTS\text{-}CTS)}$ for the second transmission rate V2 and the request-to-send/clear-to-send data transmission mechanism;

if the value of the network throughput $W2^{(Basic)}$ for the second transmission rate V2 and the basic transmission mechanism is greater than or equal to the value of the network throughput $W2^{(RTS\text{-}CTS)}$ for the second transmission rate V2 and the request-to-send/clear-to-send data transmission mechanism, selecting the basic transmission mechanism and fragment size $\tilde{x}2^{(Basic)}$ for the second transmission rate V2 and basic transmission mechanism for data transmission, otherwise, selecting the request-to-send/clear-to-send data transmission mechanism and fragment size $\tilde{x}2^{(RTS\text{-}CTS)}$ for the second transmission rate V2 and request-to-send/clear-to-send data transmission mechanism for data transmission, if the value of the network throughput $W2^{(max)}$ for the second transmission rate V2 is less than the value of the network throughput $W3^{(max)}$ for the third transmission rate V3;

comparing the value of the network throughput $W3^{(max)}$ for the third transmission rate V3 and the value of the network throughput $W4^{(max)}$ for the fourth transmission rate V4;

if the value of the network throughput $W3^{(max)}$ for the third transmission rate V3 is more than the value of the network throughput $W4^{(max)}$ for the fourth transmission rate V4, selecting the third transmission rate V3 for data transmission;

comparing the value of the network throughput $W3^{(Basic)}$ for the third transmission rate V3 and the basic transmission mechanism and the value of the network throughput $W3^{(RTS-CTS)}$ for the third transmission rate V3 and the request-to-send/clear-to-send data transmission mechanism;

if the value of the network throughput $W3^{(Basic)}$ for the third transmission rate V3 and the basic transmission mechanism is greater than or equal to the value of the network throughput $W3^{(RTS-CTS)}$ for the third transmission rate V3 and the request-to-send/clear-to-send data transmission mechanism, selecting the basic transmission mechanism and fragment size $\tilde{x}3^{(Basic)}$ for the third transmission rate V3 and basic transmission mechanism for data transmission, otherwise, selecting the request-to-send/clear-to-send data transmission mechanism and fragment size $\tilde{x}3^{(RTS-CTS)}$ for the third transmission rate V3 and request-to-send/clear-to-send data transmission mechanism for data transmission;

if the value of the network throughput $W3^{(max)}$ for the third transmission rate V3 is less than the value of the network throughput $W4^{(max)}$ for the fourth transmission rate V4, selecting the fourth transmission rate V4 for data transmission;

comparing the value of the network throughput $W4^{(Basic)}$ for the fourth transmission rate V4 and the basic transmission mechanism and the value of the network throughput $W4^{(RTS-CTS)}$ for the fourth transmission rate V4 and the request-to-send/clear-to-send data transmission mechanism;

if the value of the network throughput $W4^{(Basic)}$ for the fourth transmission rate V4 and the basic transmission mechanism is greater than or equal to the value of the network throughput $W4^{(RTS-CTS)}$ for the fourth transmission rate V4 and the request-to-send/clear-to-send data transmission mechanism, selecting the basic transmission mechanism and fragment size $\tilde{x}4^{(Basic)}$ for the fourth transmission rate V4 and basic transmission mechanism for data transmission, otherwise, selecting the request-to-send/clear-to-send data transmission mechanism and fragment size $\tilde{x}4^{(RTS-CTS)}$ for the fourth transmission rate V4 and request-to-send/clear-to-send data transmission mechanism for data transmission; and transmitting data units from the transmitter to the receiver using the selected transmission rate, data transmission mechanism and fragment size selected for this transmission rate.

27. The method of claim 26, wherein to obtain a bit error rate $\alpha_{z,V1}, \alpha_{z,V2}, \alpha_{z,V3}, \alpha_{z,V4}$ for the first, second, third and fourth transmission rate V1, V2, V3, V4 at the transmitter, a number $L1_{ACK,2}, L2_{ACK,2}, L3_{ACK,2}, L4_{ACK,2}$ of acknowledgements of receiving the second fragments transmitted after error-free receiving the first fragments in the transmission of L1, L2, L3, L4 data units is calculated, bit error rate $\alpha_{z,V1}$, $\alpha_{z,V2}, \alpha_{z,V3}, \alpha_{z,V4}$ for the first, second, third and fourth transmission rate V1, V2, V3, V4 are determined using the second fragments of L1, L2, L3, L4 transmitted data units by $$\alpha_{z,V} = 1 - \left(\frac{L_{ACK,2}}{L}\right)^{1/x},$$

where x is a fragment size.

28. The method of claim 26, wherein to obtain a bit error rate $\alpha_{z,V1}, \alpha_{z,V2}, \alpha_{z,V3}, \alpha_{z,V4}$ for the first, second, third and fourth transmission rate V1, V2, V3, V4 at the transmitter, a number $L1_{ACK,2}, L2_{ACK,2}, L3_{ACK,2}, L4_{ACK,2}$ of acknowledgements receiving of the second fragments transmitted after error-free receiving of the first fragments in the transmission of L1, L2, L3, L4 data units is calculated, bit error rate $\alpha_{z,V1}$, $\alpha_{z,V2}, \alpha_{z,V3}, \alpha_{z,V4}$ for the first, second, third and fourth transmission rate V1, V2, V3, V4 are determined using the second fragments of L1, L2, L3, L4 transmitted data units by $$\alpha_{z,V} = 1 - \left(\frac{L_{ACK,2}}{L\cdot(1-P)}\right)^{1/x},$$

where P is an estimate of the station collision probability, x is a fragment size.

29. The method of claim 26, wherein to obtain the bit error rate $\alpha_{z,V1}, \alpha_{z,V2}, \alpha_{z,V3}, \alpha_{z,V4}$ for the first, second, third and fourth transmission rate V1, V2, V3, V4 at the transmitter, bit error rates $\alpha_{z,V1}, \alpha_{z,V2}, \alpha_{z,V3}, \alpha_{z,V4}$ for the first, second, third and fourth transmission rate V1, V2, V3, V4 are determined using the second fragments of L1, L2, L3, L4 transmitted data units, bit error rates $\alpha_{z,V1}, \alpha_{z,V2}, \alpha_{z,V3}, \alpha_{z,V4}$ for the first, second, third and fourth transmission rate V1, V2, V3, V4 are determined using the first fragments of L1, L2, L3, L4 transmitted data units, bit error rates $\alpha_{z,V1}, \alpha_{z,V2}, \alpha_{z,V3}, \alpha_{z,V4}$ for the first, second, third and fourth transmission rate V1, V2, V3, V4 obtained by means of the first and second fragments of L1, L2, L3, L4 transmitted data units are averaged.

30. The method of claim 26, wherein a fragment size $\tilde{x}1^{(Basic)}, \tilde{x}2^{(Basic)}, \tilde{x}3^{(Basic)}, \tilde{x}4^{(Basic)}$ for the first transmission rate first, second, third and fourth transmission rate V1, V2, V3, V4 and basic transmission mechanism is determined by $$\tilde{x}^{(Basic)} = \begin{cases} x_{max}, & x^{(Basic)} \geq x_{max}, \\ 8\cdot ceil\{x_{max}/(8\cdot g^{(Basic)})\}, & else, \end{cases}$$

where $x_{max}$ is a size of a data unit, $g^{(Basic)}=round\{x_{max}/x^{(Basic)}\}$, round{ } means a rounding to the nearest integer, ceil{ } is a rounding up operation, $x^{(Basic)}=(b_V/2)\cdot(\sqrt{1+4/(b_V\cdot\alpha_{z,V})}-1)$, $b_V=\tau_V/t_V$, $\tau_V=c_8\cdot s+c_9+c_{10}\cdot t_V$, $c_8$=const is a constant value equal to 20, $c_9$=const is a constant value equal to 444, $c_{10}$=const is a constant value equal to 336, s is an estimate of average number of idle slots between two successive transmissions in the network, and $t_V=1/V$.

31. The method of claim 26, wherein a value of the network throughput $W1^{(Basic)}, W2^{(Basic)}, W3^{(Basic)}, W4^{(Basic)}$ for the first, second, third and fourth transmission rate V1, V2, V3, V4 and basic transmission mechanism is determined by $W^{(Basic)}=\tilde{x}^{(Basic)}\cdot(1-\alpha_{z,V})^{x^{(Basic)}}/((\tilde{x}^{(Basic)}\cdot t_V+\tau_V)\cdot(1+P/(J\cdot(1-P))))$, where $\tau_V=c_8\cdot s+c_9+c_{10}\cdot t_V$, $c_8$=const is a constant value equal to 20, $c_9$=const is a constant value equal to 444, $c_{10}$=const is a constant value equal to 336, s is an estimate of average number of idle slots between two successive transmissions in the network, $t_V=1/V$, P is an estimate of the station collision probability, and J is an estimate of the average number of stations in collision.

32. The method of claim 26, wherein a fragment size $\tilde{x}1^{(RTS-CTS)}, \tilde{x}2^{(RTS-CTS)}, \tilde{x}3^{(RTS-CTS)}, \tilde{x}4^{(RTS-CTS)}$ for the first, second, third and fourth transmission rate V1, V2, V3, V4 and request-to-send/clear-to-send transmission mechanism is determined by $$\tilde{x}^{(RTS-CTS)} = \begin{cases} x_{\max}, & x^{(RTS-CTS)} \geq x_{\max}, \\ 8 \cdot ceil\{x_{\max}/(8 \cdot g^{(RTS-CTS)})\}, & \text{else}, \end{cases}$$

where $x_{max}$ is a size of a data unit, $g^{(RTS-CTS)}=\text{round}\{x_{max}/x^{(RTS-CTS)}\}$, round{ } is a rounding operation to the nearest integer, ceil{ } in a rounding up operation, $x^{(RTS-CTS)}=(c_{V,N}/2)\cdot(\sqrt{1+4/(c_{V,N}\cdot\alpha_{z,V})}-1)$ $c_{V,N}=\tau_V^{(Frame)}/t_V+(\tau_V^{(RTS-CTS)}/t_V)\cdot(1+P/(J\cdot(1-P)))$ $\tau_V^{(RTS-CTS)}=c_{11}\cdot s+c_{12}+c_{13}\cdot t_V$, $\tau_V^{(Frame)}=c_{14}+c_{15}\cdot t_V$, $c_{11}$=const is a constant value equal to 20, $c_{12}$=const is a constant value equal to 444, $c_{13}$=const is a constant value equal to 272, $c_{14}$=const is a constant value equal to 404, $c_{15}$=const is a constant value equal to 336, s is an estimate of average number of idle slots between two successive transmissions in the network, $t_V=1/V$, P is an estimate of the station collision probability, and J is an estimate of the average number of stations in collision.

33. The method of claim 26, wherein a value of the network throughput $W1^{(RTS-CTS)}, W2^{(RTS-CTS)}, W3^{(RTS-CTS)}, W4^{(RTS-CTS)}$ for the first, second, third and fourth transmission rate V1, V2, V3, V4 and the request-to-send/clear-to-send transmission mechanism is determined by $$W^{(RTS-CTS)} = \frac{\tilde{x}^{(RTS-CTS)} \cdot (1-\alpha_{z,V})^{\tilde{x}^{(RTS-CTS)}}}{\tilde{x}^{(RTS-CTS)} \cdot t_V + \tau_V^{(Frame)} + \tau_V^{(RTS-CTS)} \cdot (1+P/(J\cdot(1-P)))},$$

where, $\tau_V^{(RTS-CTS)}=c_{11}\cdot s+c_{12}+c_{13}\cdot t_V$, $\tau_V^{(Frame)}=c_{14}+c_{15}\cdot t_V$, $c_{11}$=const is a constant value equal to 20, $c_{12}$=const is a constant value equal to 444, $c_{13}$=const is a constant value equal to 272, $c_{14}$=const is a constant value equal to 404, $c_{15}$=const is a constant value equal to 336, s is an estimate of the average number of idle slots between two successive transmissions in the network, $t_V=1/V$, P is an estimate of the station collision probability, and J is an estimate of the average number of stations in collision.

\* \* \* \* \*